United States Patent
Nakahara et al.

(10) Patent No.: US 10,194,083 B2
(45) Date of Patent: Jan. 29, 2019

(54) WOBBLE DETECTION DEVICE

(71) Applicant: Mitsubishi Electric Corporation, Tokyo (JP)

(72) Inventors: Hironori Nakahara, Tokyo (JP); Nobou Takeshita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/768,949

(22) PCT Filed: Dec. 22, 2016

(86) PCT No.: PCT/JP2016/088350
§ 371 (c)(1),
(2) Date: Apr. 17, 2018

(87) PCT Pub. No.: WO2017/111003
PCT Pub. Date: Jun. 29, 2017

(65) Prior Publication Data
US 2018/0309929 A1    Oct. 25, 2018

(30) Foreign Application Priority Data

Dec. 22, 2015    (JP) ................. 2015-249205

(51) Int. Cl.
*H04N 5/232* (2006.01)
*G06T 1/60* (2006.01)
(Continued)

(52) U.S. Cl.
CPC ....... *H04N 5/23254* (2013.01); *G06K 9/6202* (2013.01); *G06T 1/0007* (2013.01);
(Continued)

(58) Field of Classification Search
CPC ............ H04N 5/23254; H04N 5/3692; G06K 9/6202; G06T 1/0007; G06T 1/60
See application file for complete search history.

(56) References Cited

U.S. PATENT DOCUMENTS

| | | | |
|---|---|---|---|
| 5,940,634 A | 8/1999 | Nakamura | |
| 6,233,014 B1* | 5/2001 | Ochi | ........................ H04N 3/08 348/195 |

(Continued)

FOREIGN PATENT DOCUMENTS

| | | |
|---|---|---|
| JP | 10-160410 A | 6/1998 |
| JP | 2003-131279 A | 5/2003 |

(Continued)

OTHER PUBLICATIONS

Extended European Search Report issued in corresponding European Application No. 16878890.9 dated Oct. 4, 2018.

*Primary Examiner* — Antoinette T Spinks
(74) *Attorney, Agent, or Firm* — Birch, Stewart, Kolasch & Birch, LLP

(57) ABSTRACT

A wobble detection device includes a sensor unit. The sensor unit includes a one-dimensional image sensor and a one-dimensional image sensor arranged side by side in an auxiliary scanning direction so that their corresponding pixels coincide with each other in a main scanning direction, and acquires an image of an object moving in the auxiliary scanning direction as one-dimensional data. The wobble detection device makes a comparison of data corresponding to the same image region by using one-dimensional data acquired by the one-dimensional image sensor and one-dimensional data acquired by the one-dimensional image sensor and thereby detects a movement amount of the image in the main scanning direction between a time when the one-dimensional data used for the comparison was acquired (Continued)

and a time when the one-dimensional data used for the comparison was acquired.

15 Claims, 20 Drawing Sheets

(51) Int. Cl.
| | | |
|---|---|---|
| *G06K 9/62* | (2006.01) | |
| *H04N 5/369* | (2011.01) | |
| *G06T 1/00* | (2006.01) | |
| *B61K 9/08* | (2006.01) | |
| *B64D 47/08* | (2006.01) | |
| *B61L 23/04* | (2006.01) | |

(52) U.S. Cl.
CPC ............. *G06T 1/60* (2013.01); *H04N 5/3692* (2013.01); *B61K 9/08* (2013.01); *B61L 23/04* (2013.01); *B64D 47/08* (2013.01); *G06K 2009/6213* (2013.01)

(56) References Cited

U.S. PATENT DOCUMENTS

| | | | | |
|---|---|---|---|---|
| 6,630,951 | B1* | 10/2003 | Suzuki | G03D 5/00 348/208.1 |
| 2002/0114022 | A1* | 8/2002 | Tanaka | H04N 1/047 358/496 |
| 2002/0179819 | A1 | 12/2002 | Nahum | |
| 2003/0151002 | A1* | 8/2003 | Ito | G01N 23/04 250/492.1 |
| 2003/0161510 | A1* | 8/2003 | Fujii | G06K 9/00026 382/124 |
| 2011/0102813 | A1* | 5/2011 | Hayashi | B41J 11/42 358/1.5 |
| 2012/0237193 | A1* | 9/2012 | Kawarada | G02B 7/34 396/95 |
| 2016/0227126 | A1* | 8/2016 | Akashi | G01N 21/954 |

FOREIGN PATENT DOCUMENTS

| | | |
|---|---|---|
| JP | 6-18779 A | 1/2010 |
| JP | 2010-21417 A | 1/2010 |

* cited by examiner

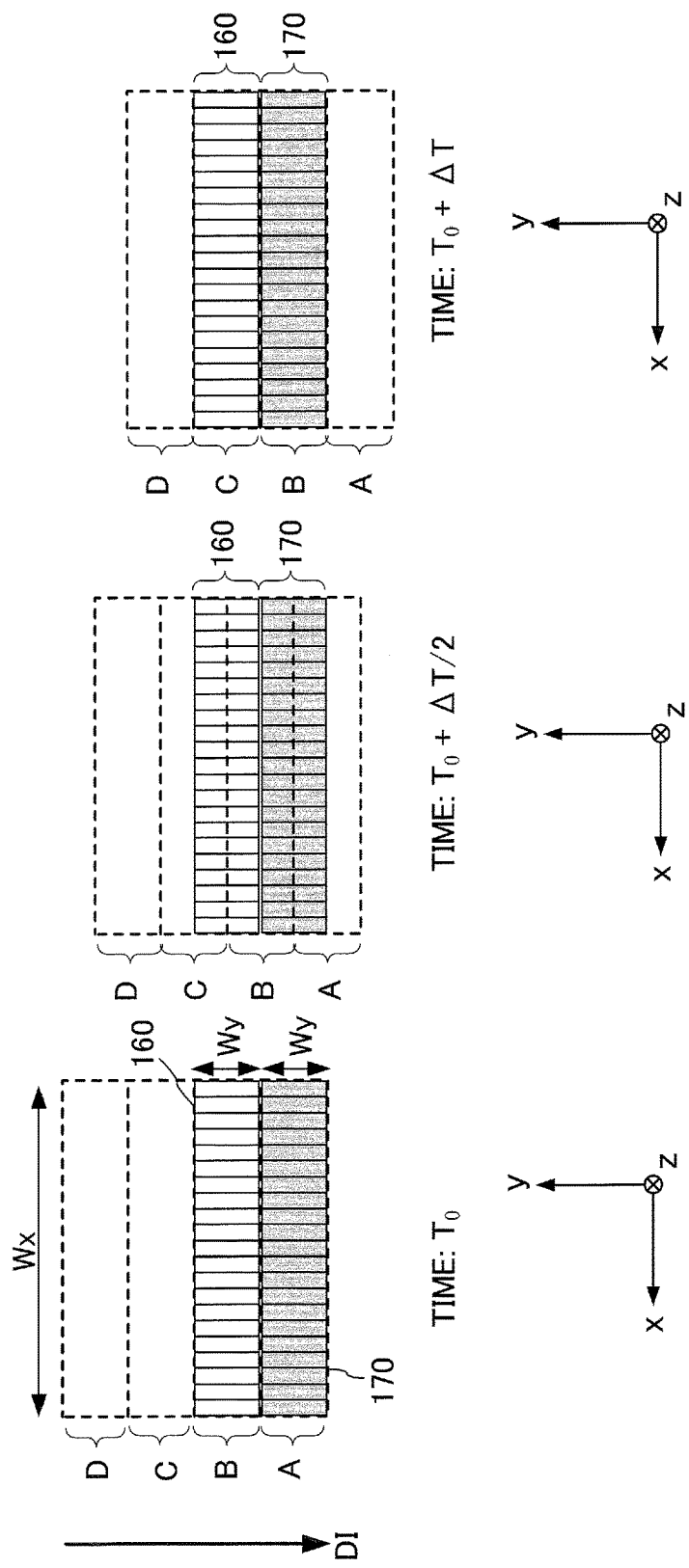

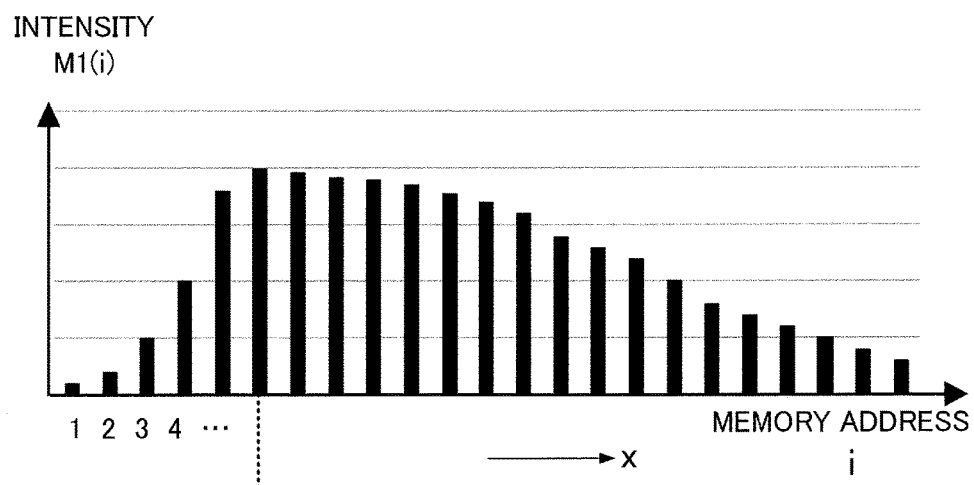

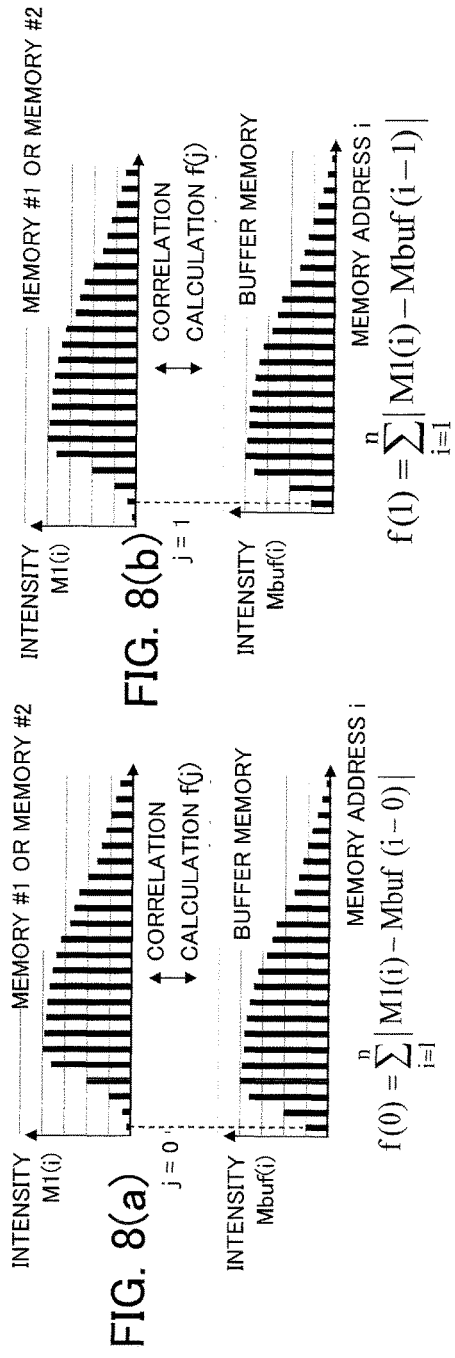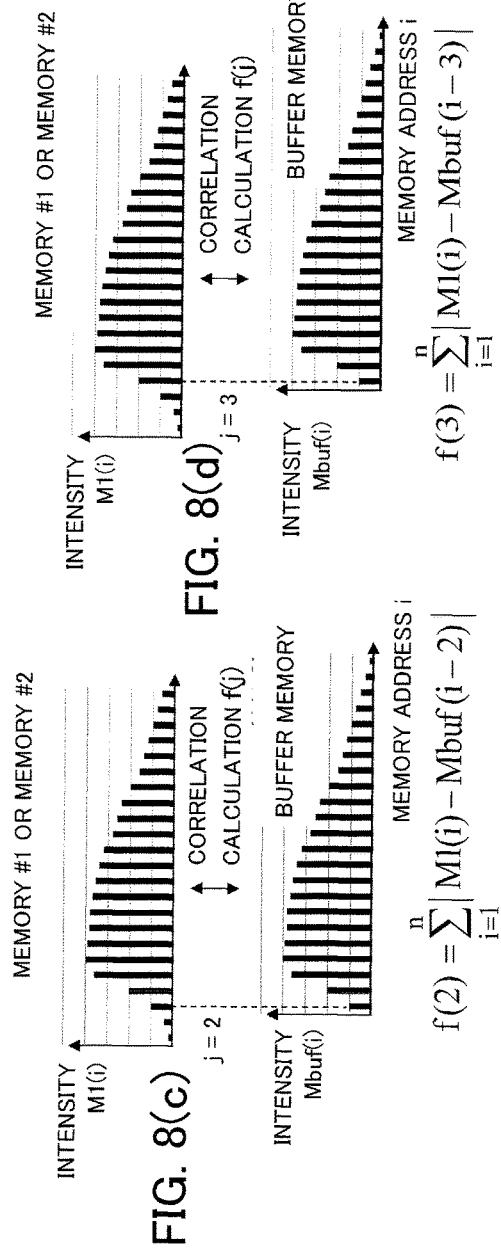

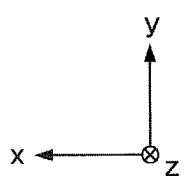
FIG. 11
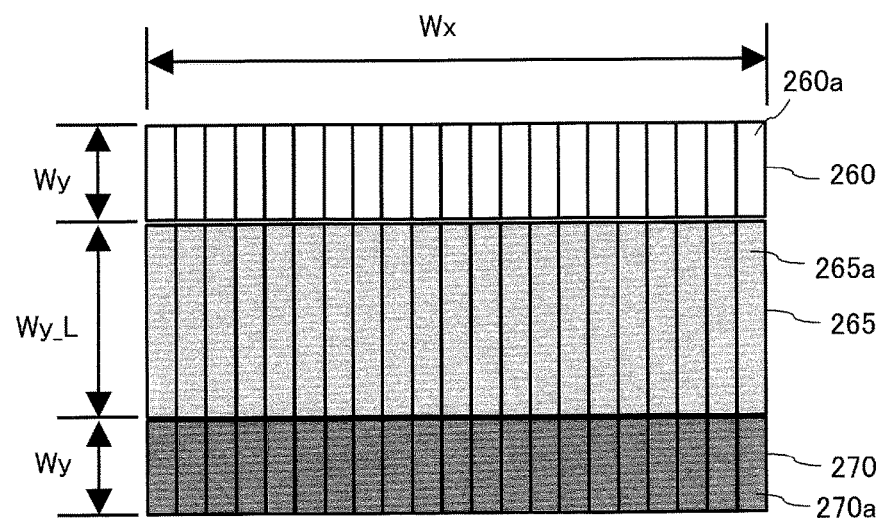

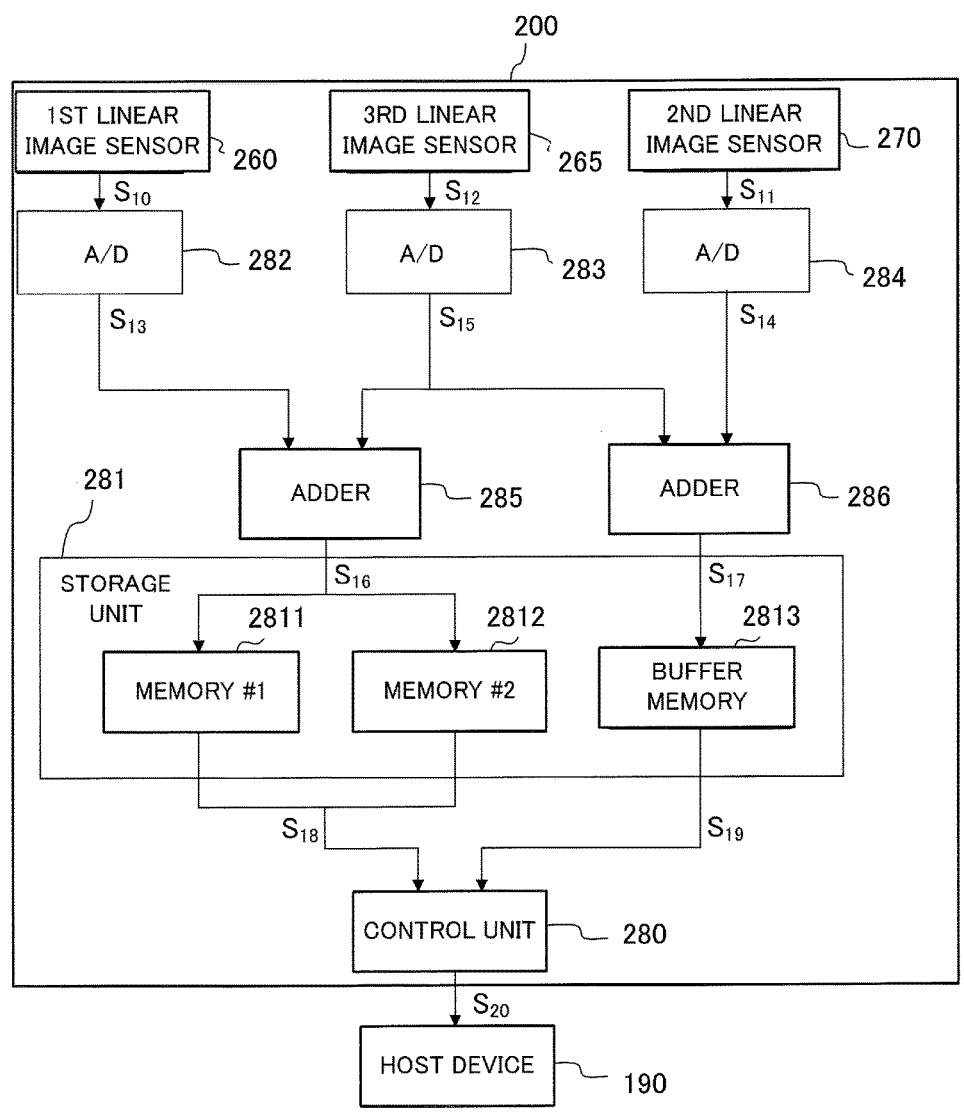

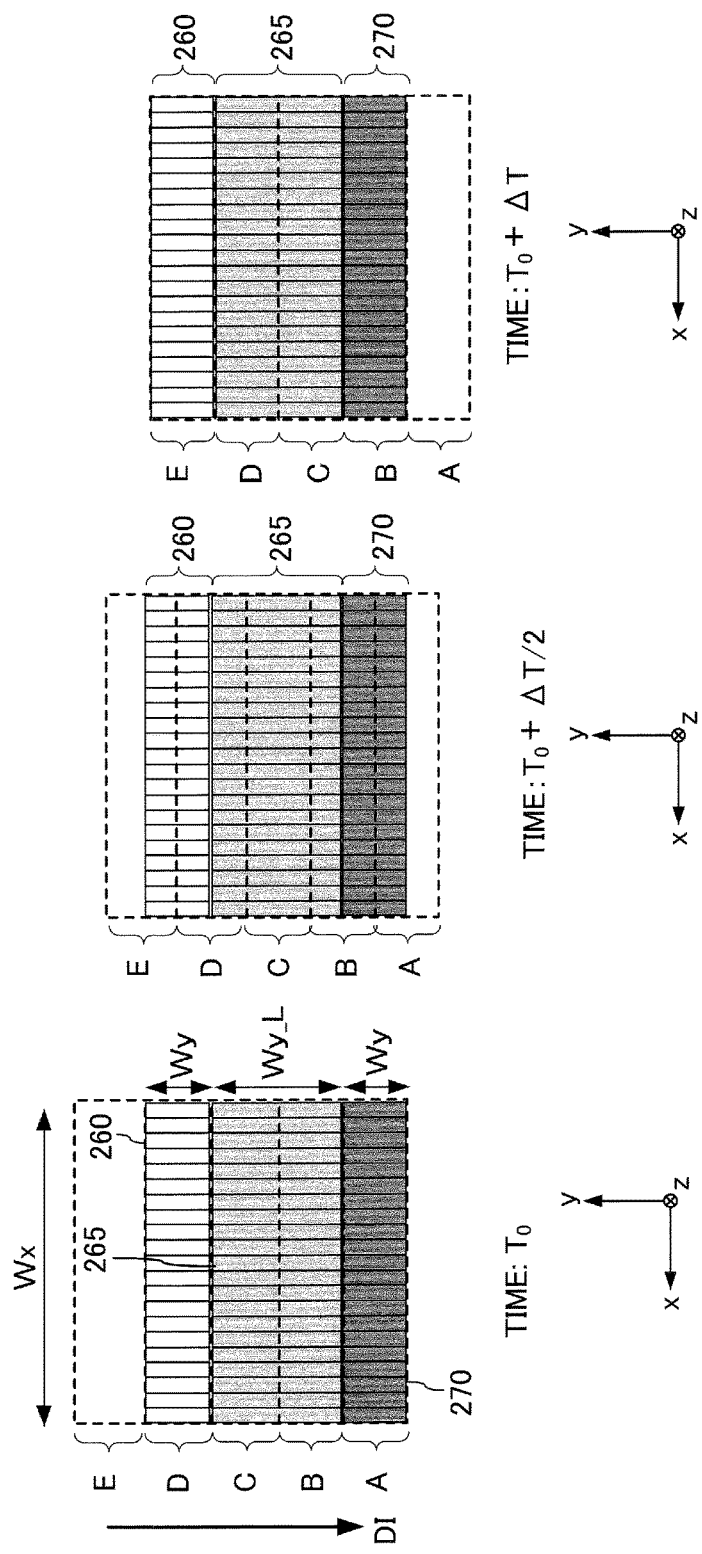

WOBBLE DETECTION DEVICE

TECHNICAL FIELD

The present invention relates to a wobble detection device for detecting a wobble amount of an object being transferred or the like, and to a wobble detection device for detecting the wobble amount of an object moving relative to the wobble detection device.

BACKGROUND ART

Patent Reference 1 describes a distance measurement device with a wobble detection function that includes a light receiving lens, a pair of line sensors, and a storage means for storing image signals outputted from the pair of line sensors, performs a distance measurement operation based on the image signals outputted from the pair of line sensors, and performs a camera shake detection operation based on variations in the image signals.

PRIOR ART REFERENCE

Patent Reference

Patent Reference 1: Japanese Patent Application Publication No. 2003-131279 (see paragraph 0012, for example)

SUMMARY OF THE INVENTION

Problem to be Solved by the Invention

However, the device described in the Patent Reference 1 is a device performing the camera shake detection operation mainly based on image signals obtained by capturing images of a stationary object (subject). Accordingly, there is a problem in that the accuracy of the wobble detection decreases when the device is used to detect the wobble amount of an object being transferred in a transfer direction by a transfer means (i.e., in the middle of transfer) or an object moving relative to the wobble detection device (i.e., in the middle of movement).

The two line sensors are arranged to obtain the distance to the subject by using the principle of triangulation. Therefore, the wobble detection becomes impossible when the object moves in a direction orthogonal to the arrangement direction of photoreceptor elements.

The object of the present invention, which has been made to resolve the above-described problem with the conventional technology, is to provide a wobble detection device capable of increasing the detection accuracy of the wobble amount of an object in the middle of transfer or movement.

Means for Solving the Problem

A wobble detection device according to an aspect of the present invention includes a sensor unit that includes a first one-dimensional image sensor and a second one-dimensional image sensor arranged side by side in an auxiliary scanning direction so that corresponding pixels of the first one-dimensional image sensor and the second one-dimensional image sensor coincide with each other in a main scanning direction, and acquires an image of an object moving in the auxiliary scanning direction as one-dimensional data. The wobble detection device makes a comparison of data corresponding to a same image region of the image by using first one-dimensional data acquired by the first one-dimensional image sensor and second one-dimensional data acquired by the second one-dimensional image sensor and thereby detects a movement amount of the image in the main scanning direction between a time when the first one-dimensional data used for the comparison was acquired and a time when the second one-dimensional data used for the comparison was acquired.

Effect of the Invention

With the wobble detection device according to the present invention, the detection accuracy of the wobble amount of a moving object can be increased.

BRIEF DESCRIPTION OF THE DRAWINGS

FIG. 5($a$) to FIG. 5($c$) are diagrams showing positional relationships between a photoreceiving region of the photoreceiving surface of each of the first and second linear image sensors and image regions moving in an image movement direction in the wobble detection device according to the first embodiment.

FIG. 7($a$) is a diagram showing intensity of each pixel in image data obtained by a scan by the first linear image sensor at a time $T_0$ and stored in a memory #1 (or a memory #2), and FIG. 7($b$) is a diagram showing intensity of each pixel in image data obtained by a scan by the second linear image sensor at a time $T_0+\Delta T$ and stored in a buffer memory.

FIG. 8($a$) to FIG. 8($d$) are diagrams showing the correlation calculation by the wobble detection device according to the first embodiment.

FIG. 11 is a plan view schematically showing a configuration of first to third linear image sensors in the wobble detection device according to the second embodiment.

FIG. 13 is a block diagram schematically showing an example of a configuration of a control system of the wobble detection device according to the second embodiment.

FIG. 14(a) to FIG. 14(c) are diagrams showing positional relationships between a photoreceiving region of the photoreceiving surface of each of the first to third linear image sensors and image regions moving in the image movement direction in the wobble detection device according to the second embodiment.

MODE FOR CARRYING OUT THE INVENTION

Figure 1:
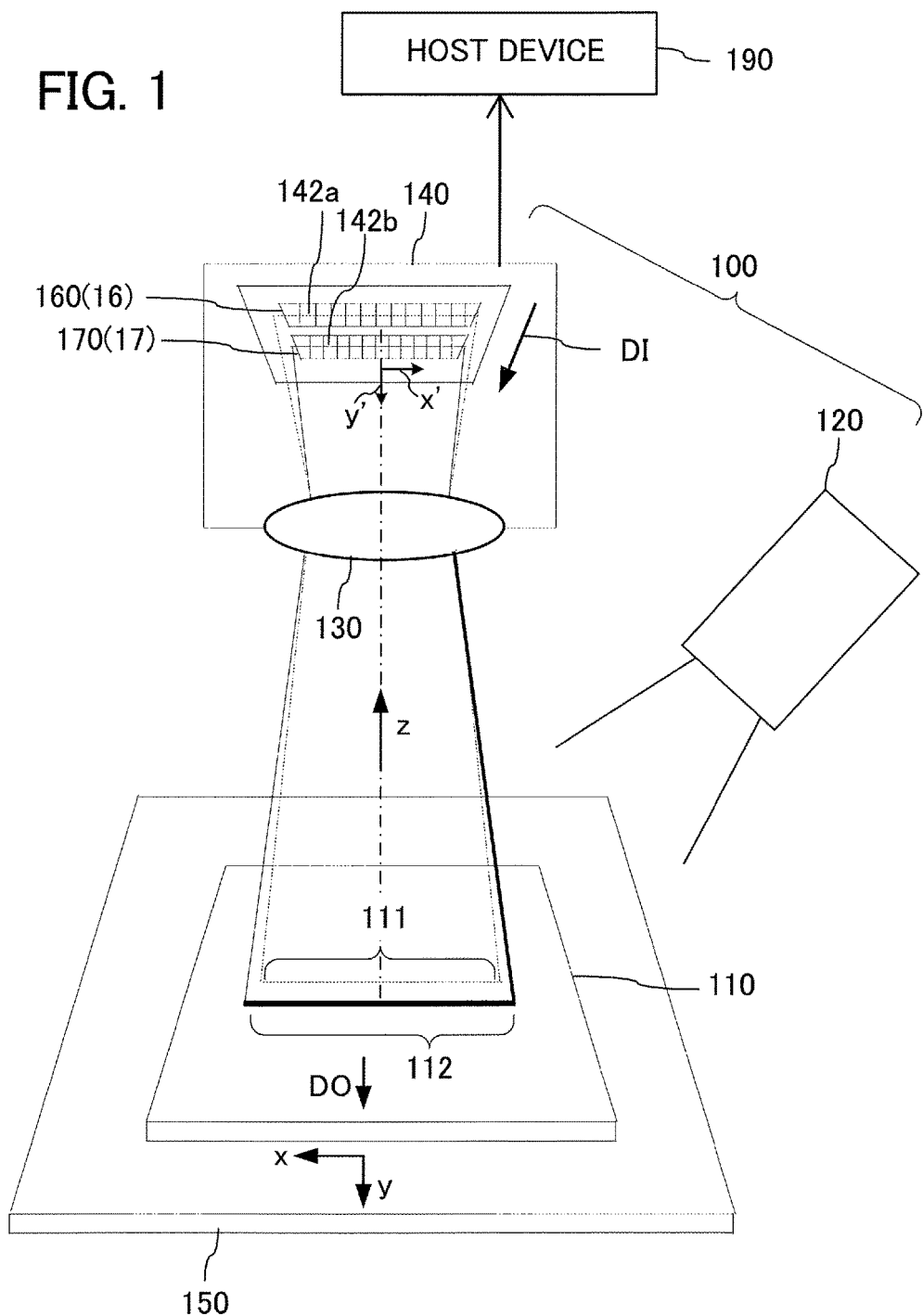
FIG. 1 is a diagram schematically showing a configuration of a wobble detection device according to a first embodiment of the present invention.

Preferred embodiments of the present invention will be described below with reference to the drawings. In the drawings, xyz orthogonal coordinate axes are shown. In the following description, a transfer direction DO of an object (e.g., test object) on a transfer apparatus (e.g., transfer line in a factory) is defined as a y-axis direction, a width direction of a wobble detection device orthogonal to the y-axis direction is defined as an x-axis direction, and a height direction of the wobble detection device orthogonal to both the x-axis direction and the y-axis direction is defined as a z-axis direction, for example.

Further, a direction of movement of the detection object (test object) with respect to the wobble detection device is defined as a +y-axis direction, for example. A direction opposite to the direction of the movement of the detection object with respect to the wobble detection device is defined as a −y-axis direction. Thus, when the detection object is stopped and the wobble detection device is moving, the wobble detection device is moving in the −y-axis direction. The y-axis direction corresponds to an auxiliary scanning direction of a scan object region of a linear image sensor which will be described later. A direction orthogonal to the y-axis and corresponding to a main scanning direction of the scan object region of the linear image sensor is assumed to be the x-axis direction. A direction orthogonal to an x-y plane is defined as the z-axis direction. A direction from the detection object to the wobble detection device is defined as a +z-axis direction, while a direction from the wobble detection device to the detection object is defined as a −z-axis direction.

The main scanning direction is a direction orthogonal to the direction of the movement of an image or a line sensor when the image is scanned by the line sensor. The direction of the movement of the image or the line sensor is the auxiliary scanning direction.

In general, an arrangement direction of photoreceptor elements of the line sensor coincides with the main scanning direction. However, the arrangement direction of the photoreceptor elements of the line sensor can have an angle with respect to the main scanning direction. In other words, the arrangement of the photoreceptor elements of the line sensor may be set to be inclined with respect to the main scanning direction. With such an arrangement, the number of pixels in the main scanning direction can be increased.

(1) First Embodiment (1-1) Configuration

FIG. 1 is a diagram schematically showing the configuration of a wobble detection device 100 according to a first embodiment of the present invention.

As shown in FIG. 1, the wobble detection device 100 includes a line scan camera 140. The "line scan camera" means a camera that uses a line sensor as an image pickup device. Thus, the line scan camera 140 captures an image as a line. By moving a subject or the camera, images are scanned line by line while shifting the position, and a two-dimensional image is formed by aligning the scanned images in a memory.

The direction in which image pickup elements of the line sensor are arranged will be referred to as the main scanning direction. Further, the direction in which the position is shifted will be referred to as the auxiliary scanning direction. In the embodiments described below, the x-axis direction is the main scanning direction and the y-axis direction is the auxiliary scanning direction.

The wobble detection device 100 can include an illumination device 120 or an imaging lens 130. The illumination device 120 illuminates a test object 110 as the object with light. The imaging lens 130 is an imaging optical system that forms an image of the test object 110.

The test object 110 is a sheet-like film, for example. Incidentally, the test object 110 is not limited to sheet-like films but can be a member having a thickness.

The test object 110 is transferred in a transfer direction (first direction) DO identical with the y-axis direction by a transfer apparatus (transfer means) 150 (e.g., belt conveyor). In the first embodiment, the transfer direction DO is the +y-axis direction.

Incidentally, the transfer apparatus 150 is not limited to an apparatus transferring the test object 110 by use of driving force. The transfer apparatus 150 can be an inclined surface on which the test object 110 is made to slide and move, for example. Alternatively, the transfer apparatus 150 can be a guide member or the like that makes the test object 110 move in the gravity direction, for example. However, the transfer speed in the transfer direction DO is desired to be a predetermined speed, and the speed is desired to be a constant speed. Specifically, after the scan of images, a two-dimensional image is formed by aligning the scanned images. Thus, the speed in the auxiliary scanning direction is desired to be previously known.

The wobble detection device 100 is, for example, a device that detects a movement amount (wobble amount) of the test object 110 in the x-axis direction by using the line scan camera 140 as image pickup equipment (image pickup means) when the test object 110 is transferred by the transfer apparatus 150 in a production line of a factory. In short, the wobble detection device 100 detects the movement amount of the test object 110 in the main scanning direction.

In the first embodiment, a wobble detection device that detects the wobble amount in the x-axis direction (second direction) will be described. The x-axis direction (second direction) is orthogonal to the transfer direction DO of the test object 110 (y-axis direction).

However, the wobble detection device 100 may detect (calculate) the wobble amount in a direction different from the transfer direction DO and not orthogonal to the transfer direction DO. In other words, the direction of the line sensor of the wobble detection device 100 may be a direction in an x-y plane and inclined with respect to the x-axis.

As shown in FIG. 1, the line scan camera 140 includes a linear image sensor 160 and a linear image sensor 170. The first linear image sensor 160 functions as a first image pickup unit 16. Namely, the first image pickup unit 16 includes the first linear image sensor 160. The second linear image sensor 170 functions as a second image pickup unit 17. Namely, the second image pickup unit 17 includes the second linear image sensor 170.

A sensor unit 10 includes the first linear image sensor 160 and the second linear image sensor 170.

Incidentally, it is also possible to use an area sensor as a quasi-linear sensor.

The first linear image sensor 160 and the second linear image sensor 170 are arranged adjacently in the y-axis direction.

Namely, the first linear image sensor 160 and the second linear image sensor 170 are arranged side by side in the y-axis direction. The first linear image sensor 160 and the second linear image sensor 170 are arranged side by side in the auxiliary scanning direction. The first linear image sensor 160 and the second linear image sensor 170 are arranged so that their corresponding pixels coincide with each other in the main scanning direction (X-axis). The "corresponding pixels" mean pixels corresponding to the same memory address i, for example.

Incidentally, the first and second linear image sensors 160 and 170 and the test object 110 are in a symmetrical relationship with respect to the center of the imaging lens 130 as a reference point.

Accordingly, the x-axis direction and the y-axis direction on the upper side (the line scan camera 140's side) of the imaging lens 130 are directions opposite to the x-axis direction and the y-axis direction on the lower side (the transfer apparatus 150's side) of the imaging lens 130. In FIG. 1, axes on the first and second linear image sensors 160 and 170 corresponding to the x-axis and the y-axis on the test object 110 are indicated as an x'-axis and a y'-axis. The +x-axis direction coincides with a −x'-axis direction. The +y-axis direction coincides with a −y'-axis direction. The following description including other embodiments will be given by using the xyz orthogonal coordinate axes.

To "adjoin each other" can mean both a case where a long side 160a of the first linear image sensor 160 and a long side 170a of the second linear image sensor 170 facing each other are in contact with each other and a case where the long side 160a and the long side 170a are not in contact with each other and there is a clearance between the long sides 160a and 170a. Thus, the first linear image sensor 160 and the second linear image sensor 170 may be arranged to be contiguous with each other at their long sides. The first linear image sensor 160 and the second linear image sensor 170 may also be arranged with a clearance between their ling sides.

In cases where there is a clearance between the long side 160a of the first linear image sensor 160 and the long side 170a of the second linear image sensor 170, enlarging the photoreceiving area is more difficult compared to cases where there is no clearance. Further, the line scan camera 140 increases in size. Therefore, the clearance between the first and second linear image sensors 160 and 170 is desired to be narrow.

In photoreceiving regions of a photoreceiving surface (imaging surface) of the first and second linear image sensors 160 and 170, images (image regions) of scan object regions of the test object 110 are formed by the imaging lens 130. The imaging lens 130 forms the images of the scan object regions of the test object 110 in the photoreceiving regions of a photoreceiving surface 141 of the first and second linear image sensors 160 and 170. Thus, a scan object region on the test object 110 corresponds to an image region on the photoreceiving surface 141. The photoreceiving surface 141 is an imaging surface. Namely, the image of a scan object region on the test object 110 is projected on an image region on the photoreceiving surface 141.

The image regions are indicated by, for example, reference characters A, B, C and D in FIG. 5(a) to FIG. 5(c) which will be explained later. The first and second linear image sensors 160 and 170 scan the images (image regions) of the test object 110 formed on the photoreceiving surface 141. Then, the first and second linear image sensors 160 and 170 output image data of images corresponding to scan object regions 111 and 112 of the test object 110. The image data outputted are analog signals, for example.

The scan object region 111 indicated by the broken line on the test object 110 in FIG. 1 represents a region scanned by the first linear image sensor 160. The scan object region 112 indicated by the solid line on the test object 110 in FIG. 1 represents a region scanned by the second linear image sensor 170.

The scan object region 111 is the region scanned by the first linear image sensor 160. The scan object region 112 is the region scanned by the second linear image sensor 170. The scan object region 112 is situated on a +y-axis side of the scan object region 111. The second linear image sensor 170 is situated on a −y-axis side (+y'-axis side) of the first linear image sensor 160.

Image regions 142a and 142b are image regions formed on the photoreceiving surface 141. The image region 142a is an image corresponding to the scan object region 111. The image region 142b is an image corresponding to the scan object region 112.

As the test object 110 is transferred in the transfer direction DO (+y-axis direction), the images (image regions) of the test object 110 formed on the photoreceiving surface 141 of the first and second linear image sensors 160 and 170 move in an image movement direction DI (+y'-axis direction). Namely, when the test object 110 moves in the +y-axis direction, the images of the test object 110 on the photoreceiving surface 141 of the first and second linear image sensors 160 and 170 move in the −y-axis direction (+y'-axis direction). When the test object 110 moves in the +y-axis direction, the image regions 142 on the photoreceiving surface 141 of the first and second linear image sensors 160 and 170 move in the −y-axis direction (+y'-axis direction).

Each of the first and second linear image sensors 160 and 170 successively performs the image scan. The first and second linear image sensors 160 and 170 repeat the scan at a certain cycle, for example. The first and second linear image sensors 160 and 170 successively output image data corresponding to the scanned images. The first and second linear image sensors 160 and 170 repeat the outputting of the image data at a certain cycle, for example.

"Successively" means to carry out work in order. In this description, "successively" means to carry out the image scan or the like in order of time. The order of time is similar in meaning to a time series.

The image data are sent to a host device 190, for example. The host device 190 generates a two-dimensional image based on the received line data.

Figure 2:
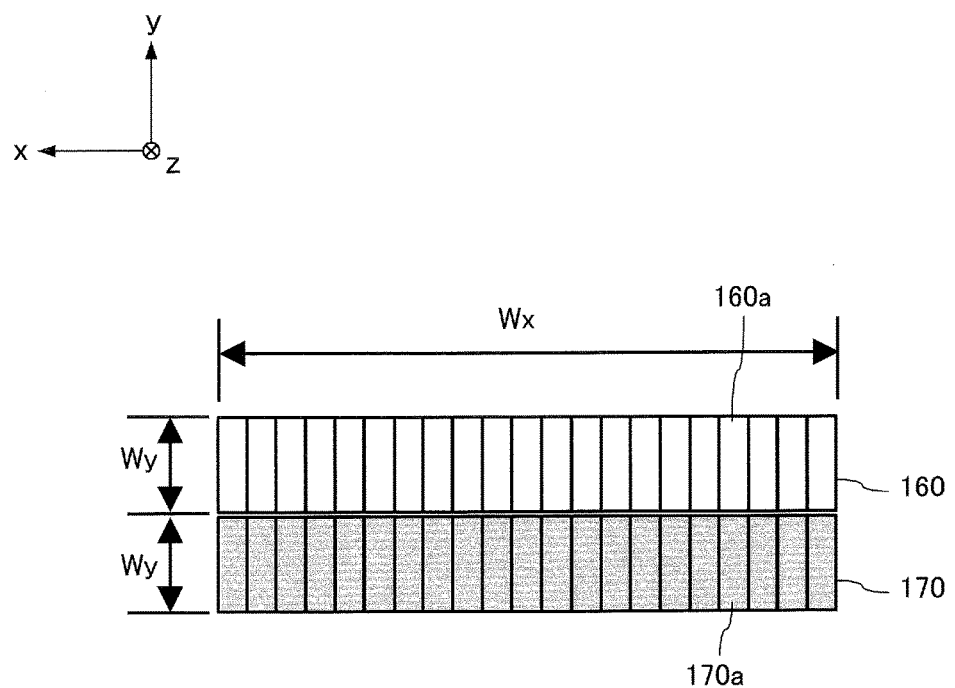
FIG. 2 is a plan view schematically showing a configuration of first and second linear image sensors in the wobble detection device according to the first embodiment.

FIG. 2 is a plan view schematically showing the configuration of the first and second linear image sensors 160 and 170.

As shown in FIG. 2, each of the first and second linear image sensors 160 and 170 includes a plurality of photoreceptor elements 160a, 170a arranged one-dimensionally in the x-axis direction. In FIG. 2, the photoreceptor elements 160a, 170a are arranged linearly, for example. The photoreceptor elements 160a, 170a convert one-dimensional image information corresponding to a scan object region of the test object 110 into an electric signal. The photoreceptor elements 160a, 170a are photodiodes, for example. The first and second linear image sensors 160 and 170 output the electric signals according to a time series. In short, the first and second linear image sensors 160 and 170 are image pickup element devices.

The "time series" means a series in which values obtained by periodical observation according to the passage of time are arranged or rearranged. In this example, "according to a time series" means to output signals of the images scanned by the first and second linear image sensors 160 and 170 in the order of the scanning.

As shown in FIG. 2, in the photoreceiving region of the photoreceiving surface 141 of each of the first and second linear image sensors 160 and 170, the dimension of the photoreceptor elements 160a, 170a in the arrangement direction (x-axis direction) is the length Wx, and the dimension of the photoreceptor elements 160a, 170a in the transfer direction DO (y-axis direction) orthogonal to the arrangement direction is the length Wy.

The length of the arranged photoreceptor elements 160a, 170a in the main scanning direction is the length Wx. In other words, the length Wx is the length of a photoreceiving part in the main scanning direction in which a plurality of photoreceptor elements 160a, 170a are arranged. The width of the arranged photoreceptor elements 160a, 170a is the length Wy. The length of the photoreceptor elements 160a, 170a in the auxiliary scanning direction is the length Wy.

The number of pixels of each of the first and second linear image sensors 160 and 170 is n (n: positive integer intrinsic to the first and second linear image sensors 160 and 170). One photoreceptor element 160a, 170a corresponds to one pixel. In FIG. 2, for example, the number of pixels of each of the first and second linear image sensors 160 and 170 is 21.

Figure 3:
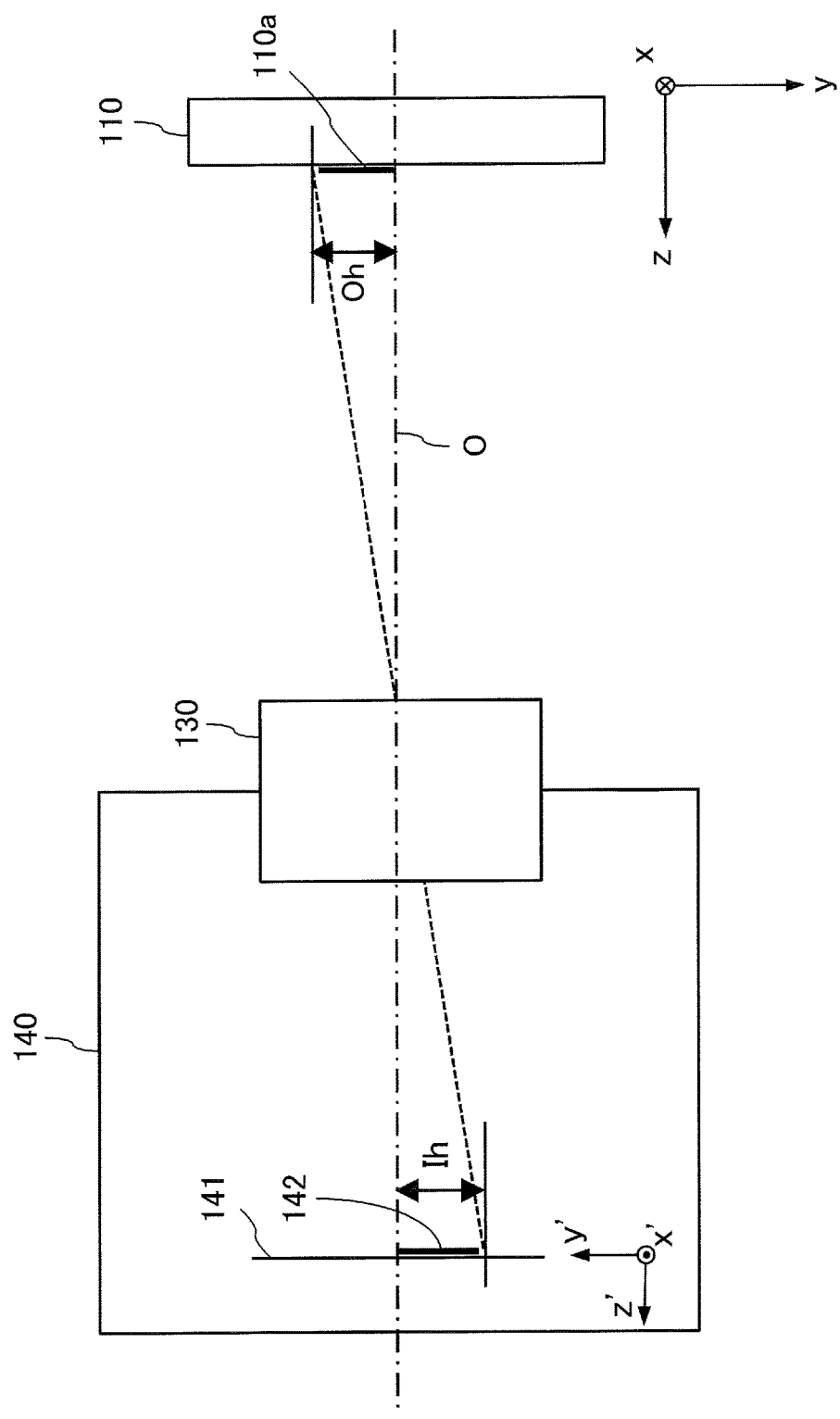
FIG. 3 is a diagram showing a relationship between a scan object region of a test object and an image (image region) formed on a photoreceiving surface (imaging surface) of a first/second linear image sensor in the wobble detection device according to the first embodiment.

FIG. 3 is a diagram showing a relationship between a scan object region 110a of the test object 110 and the image (image region 142) formed on the photoreceiving surface (imaging surface) 141 of each of the first and second linear image sensors 160 and 170 in the wobble detection device 100.

The imaging lens 130 of the wobble detection device 100 is a convex lens that forms an isometric image, for example. Thus, in the first embodiment, the y-axis direction height of the scan object region 110a of the test object 110 (the scan object region 111, 112 in FIG. 1) is defined as Oh. The y-axis direction height of the image (image region 142) formed on the photoreceiving surface 141 of each of the first and second linear image sensors 160 and 170 of the line scan camera 140 is defined as Ih. Since the imaging lens 130 is a non-magnifying lens, the height Oh equals the height Ih. Namely, height Oh=height Ih holds. Further, the image region 142 and the scan object region 110a are inverted with respect to the optical axis O of the imaging lens 130. However, the imaging lens 130 is not limited to non-magnifying lenses.

Figure 4:
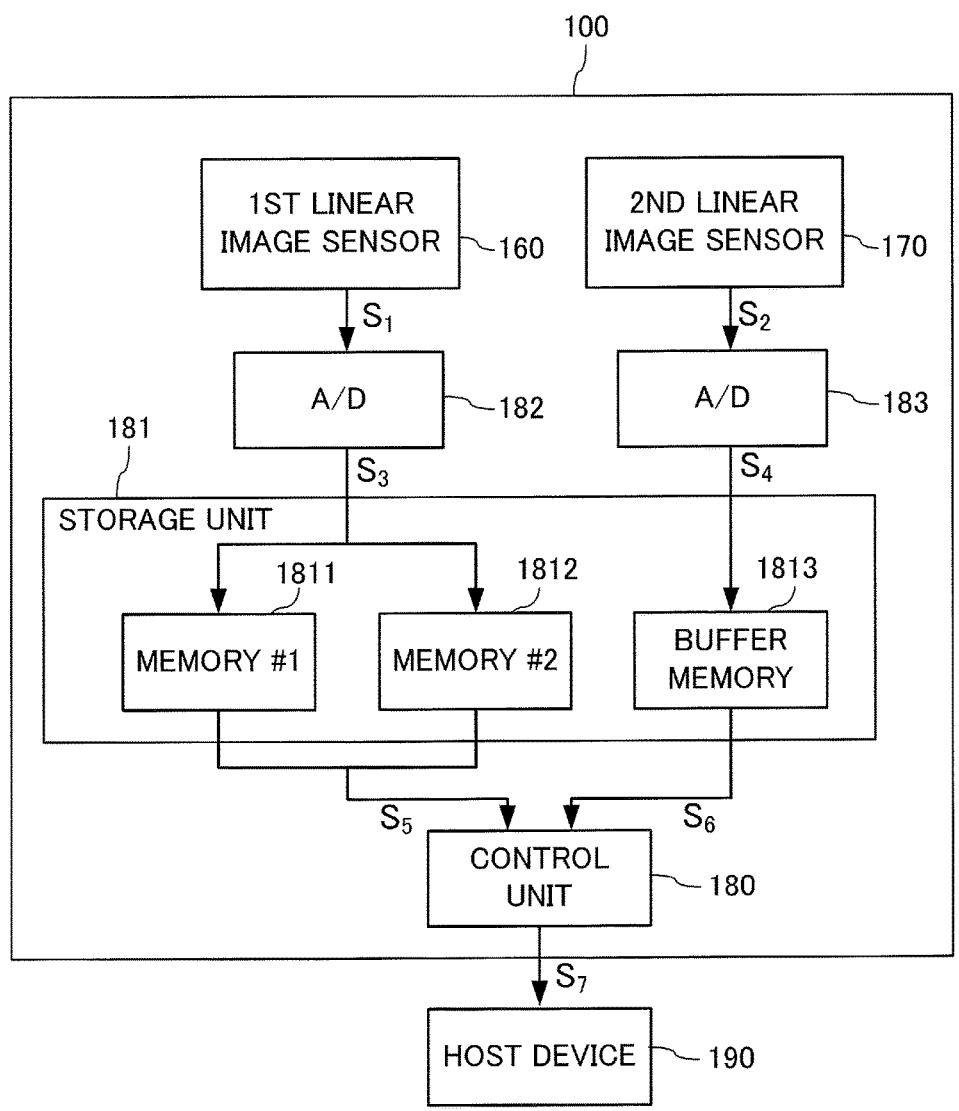
FIG. 4 is a block diagram schematically showing an example of the configuration of a control system of the wobble detection device according to the first embodiment.

FIG. 4 is a block diagram schematically showing an example of a configuration of a control system of the wobble detection device 100 according to the first embodiment.

As shown in FIG. 4, the wobble detection device 100 includes a control unit 180, a storage unit 181, and the first and second linear image sensors 160 and 170. The wobble detection device 100 can include A/D (analog to digital) converters 182 and 183.

The storage unit 181 includes a memory #1 (first memory 1811) and a memory #2 (second memory 1812) as a first storage unit and a buffer memory 1813 as a second storage unit, for example. The storage unit 181 includes the first storage unit and the second storage unit, for example. The first storage unit includes the memory 1811 and the memory 1812, for example. The second storage unit includes the buffer memory 1813, for example. Incidentally, the buffer memory 1813 can be left out in cases where the signals from the second linear image sensor 170 are directly sent to the control unit 180 and processed.

The buffer memory is a storage area or device that temporarily stores information.

In the following description, the memory 1811 will be referred to as the memory #1. Similarly, the memory 1812 will be referred to as the memory #2.

In the memory #1 and the memory #2, reference image data as first image data is stored. In the buffer memory 1813, comparative image data as second image data is stored.

Information regarding the image of the scan object region 110a of the test object 110 scanned by the first and second linear image sensors 160, 170 is outputted respectively to the A/D converter 182, 183 as image data as analog information.

The first linear image sensor 160 sends data $S_1$ to the A/D converter 182. The data $S_1$ is the image data obtained by the scan by the first linear image sensor 160. The data $S_1$ is an analog signal.

The second linear image sensor 170 sends data $S_2$ to the A/D converter 183. The data $S_2$ is the image data obtained by the scan by the second linear image sensor 170. The data $S_2$ is an analog signal.

The image data outputted is converted by the A/D converter 182, 183 into a digital signal and stored in one of the memory #1, the memory #2 and the buffer memory 1813 of the storage unit 181.

The A/D converter 182 outputs data $S_3$. The A/D converter 183 outputs data $S_4$. The data $S_3$ and $S_4$ are digital signals. The data $S_3$ is sent to the memory #1 or the memory #2. The data $S_4$ is sent to the buffer memory 1813. The memory #1 or the memory #2 stores the received data $S_3$. The buffer memory 1813 stores the received data $S_4$.

The image scan and the outputting of image data by the first and second linear image sensors 160 and 170 are performed at a certain cycle, for example. Thus, image data of the test object 110 are stored in the storage unit 181 in regard to each time series.

The first and second linear image sensors 160 and 170 perform the image scan periodically. The first and second linear image sensors 160 and 170 output the data $S_1$ and $S_2$ periodically. Similarly, the A/D converters 182 and 183 output the data $S_3$ and $S_4$ periodically. The storage unit 181 stores the data $S_3$ and $S_4$ corresponding to the times when the data $S_3$ and $S_4$ were received.

The control unit 180 performs correlation calculation in regard to two types of image data stored in the storage unit 181 regarding the same scan object region 110*a* of the test object 110. The control unit 180 detects the wobble amount based on the result of the correlation calculation. The two types of image data are the reference image data stored in the memory #1 and the comparative image data stored in the buffer memory 1813, for example. Alternatively, the two types of image data are the reference image data stored in the memory #2 and the comparative image data stored in the buffer memory 1813, for example. The result of the correlation calculation is, for example, an extremum of a value f(j) representing a correlation value which will be explained later. The wobble amount is, for example, the movement amount of the test object 110 in the x-axis direction.

The control unit 180 receives data $S_5$ from the memory #1 or the memory #2. Here, the data $S_5$ is assumed to be identical with the data $S_3$ for simplicity of explanation. Further, the control unit 180 receives data $S_6$ from the buffer memory 1813. Here, the data $S_6$ is assumed to be identical with the data $S_4$ for simplicity of explanation.

The control unit 180 performs the correlation calculation by using the data $S_5$ and the data $S_6$. The control unit 180 determines the wobble amount based on the result of the correlation calculation.

Further, the control unit 180 transmits the detected wobble amount to the host device 190. For example, the control unit 180 transmits data $S_7$ including the determined wobble amount to the host device 190. The control unit 180 can include a storage unit (e.g., semiconductor memory) for storing software and an information processing unit such as a CPU (Central Processing Unit) for executing the software as its components. The control unit 180 may also be configured as a part of the host device 190.

FIG. 5(*a*) to FIG. 5(*c*) are diagrams showing positional relationships between the photoreceiving region of the photoreceiving surface 141 of each of the first and second linear image sensors 160 and 170 and image regions A, B, C and D moving in the image movement direction DI in the wobble detection device 100.

The imaging lens 130 forms an image of the test object 110 on the photoreceiving surface 141 of the first and second linear image sensors 160 and 170. The image of the test object 110 formed on the photoreceiving surface 141 will be explained below while dividing the image into regions A, B, C and D. The regions A, B, C and D will be referred to as image regions.

FIG. 5(*a*) shows the image regions A, B, C and D at a time $T_0$. FIG. 5(*b*) shows the image regions A, B, C and D at a time $T_0+\Delta T/2$. FIG. 5(*c*) shows the image regions A, B, C and D at a time $T_0+\Delta T$.

In FIG. 5(*a*) to FIG. 5(*c*), the region filled in with light gray indicates the photoreceiving region of the photoreceiving surface 141 of the first linear image sensor 160. The sensor region filled in with dark gray indicates the photoreceiving region of the photoreceiving surface 141 of the second linear image sensor 170.

The length of each image regions A, B, C, D on the photoreceiving surface 141 in the image movement direction DI equals the y-axis direction length Wy of the photoreceiving region of the photoreceiving surface 141 of the first/second linear image sensor 160, 170. Further, in cases where the imaging lens 130 is a non-magnifying lens, the y-axis direction dimension of a scan object region on the test object 110 (region corresponding to an image region A, B, C, D) is the length Wy.

The time necessary for the image regions A, B, C and D to advance the distance Wy when the test object 110 is transferred in the transfer direction DO by the transfer apparatus 150 is assumed to be $\Delta T$. In this case, the transfer speed of the test object 110 in the transfer direction DO is Wy/$\Delta T$. Due to the transfer of the test object 110 in the transfer direction DO, the image regions A, B, C and D on the photoreceiving surface 141 move in the image movement direction DI.

Specifically, the image scan by the first linear image sensor 160 and the image scan by the second linear image sensor 170 are performed in sync with each other. Further, the image scans by the first linear image sensor 160 and the second linear image sensor 170 are performed at intervals equal to the time necessary for the image to move the length Wy in the auxiliary scanning direction.

As shown in FIG. 5(*a*), at the time $T_0$, the image region B on the photoreceiving surface 141 overlaps with the photoreceiving region of the photoreceiving surface 141 of the first linear image sensor 160 to coincide with the photoreceiving region. In other words, at the time $T_0$, the image region B of the image of the test object 110 is situated on the photoreceiving region of the photoreceiving surface 141 of the first linear image sensor 160.

Further, at the time $T_0$, the image region A overlaps with the photoreceiving region of the photoreceiving surface 141 of the second linear image sensor 170 to coincide with the photoreceiving region. In other words, at the time $T_0$, the image region A of the image of the test object 110 is situated on the photoreceiving region of the photoreceiving surface 141 of the second linear image sensor 170.

When the time $\Delta T/2$ elapses from the time $T_0$ to the time $T_0+\Delta T/2$, the image regions A, B, C and D move in the image movement direction DI from the state shown in FIG. 5(*a*) by a distance equal to the half (Wy/2) of the length Wy of the photoreceptor element 160*a*, 170*a*.

As shown in FIG. 5(*b*), at the time $T_0+\Delta T/2$, the image region B overlaps with both of a −y-axis direction half (Wy/2) region of the photoreceiving region of the photoreceiving surface 141 of the first linear image sensor 160 and a +y-axis direction half (Wy/2) region of the photoreceiving region of the photoreceiving surface 141 of the second linear image sensor 170.

In other words, at the time $T_0+\Delta T/2$, half of the image region B on the −y-axis side is situated at the position of half of the photoreceiving region of the photoreceiving surface 141 of the second linear image sensor 170 on the +y-axis side. Half of the image region B on the +y-axis side is situated at the position of half of the photoreceiving region of the photoreceiving surface 141 of the first linear image sensor 160 on the −y-axis side.

Further, a −y-axis direction half region of the image region C overlaps with a +y-axis direction half (Wy/2) region of the photoreceiving region of the photoreceiving surface of the first linear image sensor 160.

Furthermore, a +y-axis direction half region of the image region A overlaps with a −y-axis direction half (Wy/2) region of the photoreceiving region of the photoreceiving surface of the second linear image sensor 170.

When the time $\Delta T/2$ elapses further from the time $T_0+\Delta T/2$ to the time $T_0+\Delta T$, the image regions A, B, C and D move in the image movement direction DI from the state shown in FIG. 5(b) by the distance equal to the half (Wy/2) of the length Wy of the photoreceptor element 160a, 170a.

As shown in FIG. 5(c), at the time $T_0+\Delta T$, the image region B overlaps with the photoreceiving region of the photoreceiving surface of the second linear image sensor 170 to coincide with the photoreceiving region. In other words, at the time $T_0+\Delta T$, the image region B of the image of the test object 110 is situated on the photoreceiving region of the photoreceiving surface 141 of the second linear image sensor 170.

Further, the image region C overlaps with the photoreceiving region of the photoreceiving surface of the first linear image sensor 160 to coincide with the photoreceiving region. In other words, at the time $T_0+\Delta T$, the image region C of the image of the test object 110 is situated on the photoreceiving region of the photoreceiving surface 141 of the first linear image sensor 160.

As above, with the elapse of the time $\Delta T$, the image regions A, B, C and D move the distance equal to the length Wy of the photoreceptor element 160a, 170a from the state shown in FIG. 5(a) to the state shown in FIG. 5(c).

Figure 6A:
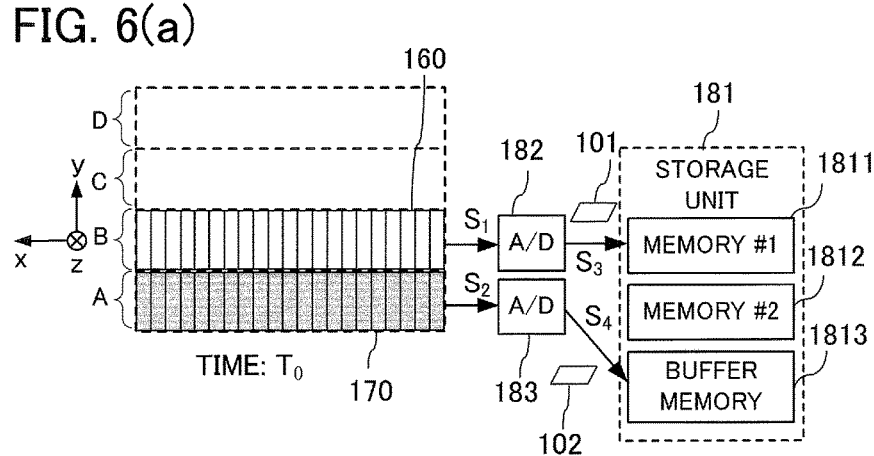
FIG. 6($a$) to FIG. 6($c$) are diagrams showing the flow of a process in which a control unit of the wobble detection device according to the first embodiment performs correlation calculation by using image data outputted from the first and second linear image sensors.
Figure 6B:
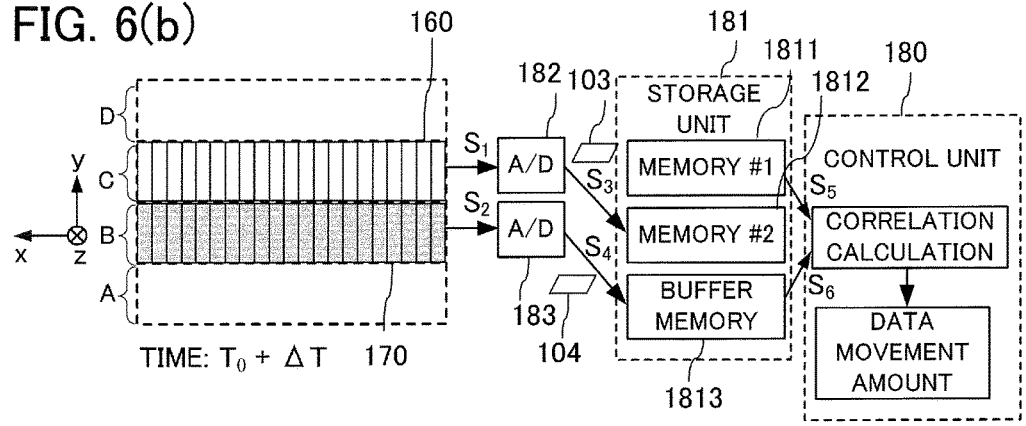
Figure 6C:
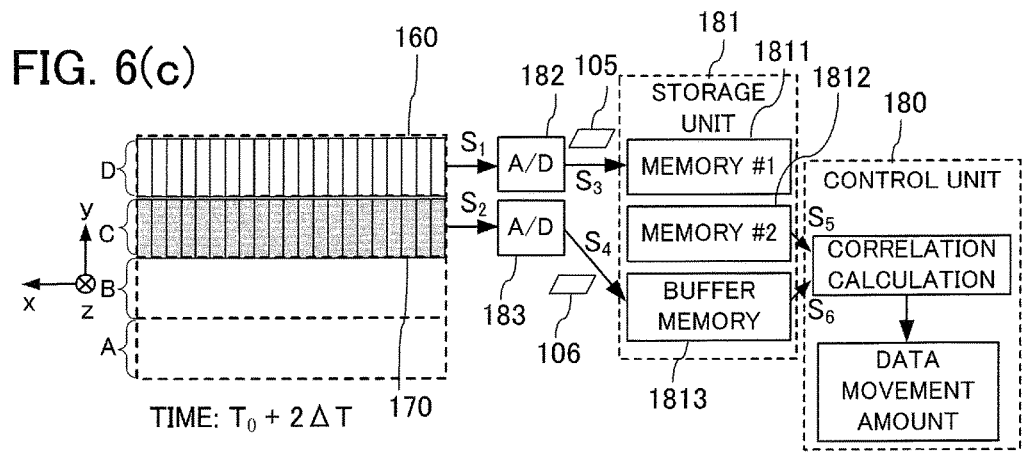

FIG. 6(a) to FIG. 6(c) are diagrams showing the flow of a process in which the control unit 180 of the wobble detection device 100 performs the correlation calculation by using the image data outputted from the first and second linear image sensors 160 and 170.

Each piece of data processed will be assigned the reference character shown in FIG. 6 as well as the reference character shown in FIG. 4 in a parenthesized style.

As shown in FIG. 6(a), at the time $T_0$, the image region B overlaps with the photoreceiving region of the photoreceiving surface 141 of the first linear image sensor 160 to coincide with the photoreceiving region. In other words, the image region B is situated on the photoreceiving region of the photoreceiving surface 141 of the first linear image sensor 160. The first linear image sensor 160 scans the image in the image region B. Then, the first linear image sensor 160 outputs image data 101 (data $S_1$) corresponding to the image region B. The outputted image data 101 (data $S_1$) is converted by the A/D converter 182 into a digital signal. The image data converted into the digital signal (data $S_3$) is sent to the memory #1. The image data (data $S_3$) is stored in the memory #1.

Further, at the time $T_0$, the image region A overlaps with the photoreceiving region of the photoreceiving surface 141 of the second linear image sensor 170 to coincide with the photoreceiving region. In other words, the image region A is situated on the photoreceiving region of the photoreceiving surface 141 of the second linear image sensor 170. The second linear image sensor 170 scans the image in the image region A. Then, the second linear image sensor 170 outputs image data 102 (data $S_2$) corresponding to the image region A. The outputted image data 102 (data $S_2$) is converted by the A/D converter 183 into a digital signal. The image data converted into the digital signal (data $S_4$) is sent to the buffer memory 1813. The image data (data $S_4$) is stored in the buffer memory 1813.

As shown in FIG. 6(b), at the time $T_0+\Delta T$, the image region C overlaps with the photoreceiving region of the photoreceiving surface 141 of the first linear image sensor 160 to coincide with the photoreceiving region. In other words, the image region C is situated on the photoreceiving region of the photoreceiving surface 141 of the first linear image sensor 160. The first linear image sensor 160 scans the image in the image region C. Then, the first linear image sensor 160 outputs image data 103 (data $S_1$) corresponding to the image region C. The outputted image data 103 (data $S_1$) is converted by the A/D converter 182 into a digital signal. The image data converted into the digital signal (data $S_3$) is sent to the memory #2. The image data (data $S_3$) is stored in the memory #2.

Further, at the time $T_0+\Delta T$, the image region B overlaps with the photoreceiving region of the photoreceiving surface of the second linear image sensor 170 to coincide with the photoreceiving region. In other words, the image region B is situated on the photoreceiving region of the photoreceiving surface 141 of the second linear image sensor 170. The second linear image sensor 170 scans the image in the image region B. Then, the second linear image sensor 170 outputs image data 104 (data $S_2$) corresponding to the image region B. The outputted image data 104 (data $S_2$) is converted by the A/D converter 183 into a digital signal. The image data converted into the digital signal (data $S_4$) is sent to the buffer memory 1813. The image data (data $S_4$) is stored in the buffer memory 1813.

As shown in FIG. 6(a) and FIG. 6(b), the image data 101 (data $S_3$) of the image region B at the time $T_0$ is stored in the memory #1. Further, the image data 104 (data $S_4$) of the image region B at the time $T_0+\Delta T$ is stored in the buffer memory 1813.

The control unit 180 performs the correlation calculation in regard to the image data 101 (data $S_3$) of the image region B stored in the memory #1 and the image data 104 (data $S_4$) of the image region B stored in the buffer memory 1813. Then, the control unit 180 calculates the movement amount (wobble amount) of the image data 104 (data $S_6$) in the time $\Delta T$ based on the result of the calculation. The control unit 180 calculates the movement amount of the image data 104 (data $S_6$) in the x-axis direction with respect to the image data 101 (data $S_5$). The method of the correlation calculation will be described later.

As shown in FIG. 6(c), at the time $T_0+2\Delta T$, the image region D overlaps with the photoreceiving region of the photoreceiving surface of the first linear image sensor 160 to coincide with the photoreceiving region. In other words, the image region D is situated on the photoreceiving region of the photoreceiving surface 141 of the first linear image sensor 160. The first linear image sensor 160 scans the image in the image region D. Then, the first linear image sensor 160 outputs image data 105 (data $S_1$) corresponding to the image region D. The outputted image data 105 (data $S_1$) is converted by the A/D converter 182 into a digital signal. The image data converted into the digital signal (data $S_3$) is sent to the memory #1. The image data (data $S_3$) is stored in the memory #1.

Further, at the time $T_0+2\Delta T$, the image region C overlaps with the photoreceiving region of the photoreceiving surface of the second linear image sensor 170 to coincide with the photoreceiving region. In other words, the image region C is situated on the photoreceiving region of the photoreceiving surface 141 of the second linear image sensor 170. The second linear image sensor 170 scans the image in the image region C. Then, the second linear image sensor 170 outputs image data 106 (data $S_2$) corresponding to the image region C. The outputted image data 106 (data $S_2$) is converted by the A/D converter 183 into a digital signal. The image data converted into the digital signal (data $S_4$) is sent to the buffer memory 1813. The image data (data $S_4$) is stored in the buffer memory 1813.

As shown in FIG. 6(b) and FIG. 6(c), the image data 103 (data $S_3$) of the image region C at the time $T_0+\Delta T$ is stored in the memory #2. Further, the image data 106 (data $S_4$) of the image region C at the time $T_0+2\Delta T$ is stored in the buffer memory 1813.

The control unit 180 performs the correlation calculation in regard to the image data 103 (data $S_3$) of the image region C stored in the memory #2 and the image data 106 (data $S_4$) of the image region C stored in the buffer memory 1813. Then, the control unit 180 calculates the movement amount (wobble amount) of the image data 104 (data $S_6$) in the time $\Delta T$ based on the result of the calculation. The control unit 180 calculates the movement amount of the image data 106 (data $S_6$) in the x-axis direction with respect to the image data 103 (data $S_5$).

Thereafter, according to the same method, the movement amount (wobble amount) of the image data (data $S_6$) in the direction of the length Wx is calculated successively by the correlation calculation between the comparative image data (data $S_6$) stored in the buffer memory 1813 and the reference image data (data $S_5$) stored in the memory #1 or the memory #2 one cycle earlier.

The length Wx is the length of the photoreceptor elements 160a, 170a in the arrangement direction (x-axis direction). Thus, the direction of the length Wx is the x-axis direction in the first embodiment. Namely, the direction of the length Wx is the main scanning direction in the first embodiment.

Next, the method of the correlation calculation will be described below with reference to FIG. 7(a), FIG. 7(b), FIG. 8(a), FIG. 8(b), FIG. 8(c) and FIG. 8(d). In each of the drawings, the horizontal axis represents the memory address i and the vertical axis represents signal intensity of each pixel.

FIG. 7(a) is a diagram showing the signal intensity M1(i) of each pixel in the reference image data (e.g., image data 101) obtained by the scan by the first linear image sensor 160 at the time $T_0$ and stored in the memory #1 (or the memory #2).

FIG. 7(b) is a diagram showing the signal intensity Mbuf(i+j) of each pixel in the comparative image data (e.g., image data 104) obtained by the scan by the second linear image sensor 170 at the time $T_0+\Delta T$ and stored in the buffer memory 1813.

FIG. 8(a) to FIG. 8(d) are diagrams for explaining the correlation calculation by the wobble detection device 100.

In FIG. 7(a) and FIG. 7(b), the vertical axis represents the signal intensity of image data and the horizontal axis represents the memory address i of the image data. Similarly, in FIG. 8(a) to FIG. 8(d), the vertical axis represents the signal intensity of image data and the horizontal axis represents the memory address i of the image data. High signal intensity indicates that the pixel is bright. The value i of the memory address i increases in the +x-axis direction.

The memory address i of the image data corresponds to the x-axis direction position of each of the photoreceptor elements 160a, 170a arranged in a line in the x-axis direction. The reference characters i are natural numbers. Alternatively, the reference characters i may include zero (i=0, 1, 2, . . . , n). The reference characters i correspond to the order of the arrangement of the photoreceptor elements 160a, 170a. The numerical value j represents a shift value (integer) of the comparative image data in the correlation calculation.

The shift value j is a value by which the memory address i is incremented or decremented. According to the shift value j, the memory address i is incremented or decremented when the image data is shifted rightward or leftward as shown in FIG. 8, for example.

Suppose no wobble occurs during the time $\Delta T$, the reference image data stored in the memory #1 or the memory #2 shown in FIG. 7(a) and the comparative image data stored in the buffer memory 1813 shown in FIG. 7(b) have the same value as each other at the same memory address i.

However, in cases where a wobble occurred during the time $\Delta T$, the reference image data stored in the memory #1 or the memory #2 shown in FIG. 7(a) and the comparative image data stored in the buffer memory 1813 shown in FIG. 7(b) have values different from each other at the same memory address i.

As such a case where a wobble occurred, in FIG. 7, the image of the data shown in FIG. 7(b) has moved (wobbled) in the −x-axis direction by the distance S with respect to the image of the data shown in FIG. 7(a) during the time $\Delta T$, for example. In FIG. 7(a), the distance S equals a length corresponding to two pixels. The reference image data is the image data 101, for example. The comparative image data is the image data 104, for example.

Specifically, the comparative image data (e.g., image data 104) stored in the buffer memory 1813 has moved in the −x-axis direction by the distance S in comparison with the reference image data (e.g., image data 101) stored in the memory #1 (or the memory #2). The reference image data stored in the memory #1 (or the memory #2) is shown in FIG. 7(a). The comparative image data stored in the buffer memory 1813 is shown in FIG. 7(b). A leftward direction in FIG. 7(a) and FIG. 7(b) is the −x-axis direction shown in FIG. 5, for example.

In other words, movement (wobble) for a movement amount (wobble amount) corresponding to the distance S has occurred during the time $\Delta T$. Namely, the test object 110 has moved in the main scanning direction with respect to the wobble detection device 100 for the movement amount corresponding to the distance S during the time $\Delta T$. Incidentally, the actual movement amount of the test object 110 is determined from the magnification of the imaging lens 130 and the distance S.

Here, in order to calculate the moving distance of the image, a position where the correlation between the reference image data and the comparative image data becomes the strongest is detected by means of the correlation calculation. The moving distance of the image is the distance S in FIG. 7(a) and FIG. 7(b), for example.

As shown in FIG. 8(a) to FIG. 8(d), in the correlation calculation, the sum total of differences from the image data stored in the buffer memory 1813 is calculated, for example, while shifting the pixel positions (memory addresses i) of the image data stored in the memory #1 (or the memory #2) and the image data stored in the buffer memory 1813 in a transverse direction (+x-axis direction or −x-axis direction) in units of pixels.

The correlation calculation is performed while shifting the memory addresses i of the image data stored in the buffer memory 1813 with respect to the image data stored in the memory #1 (or the memory #2), for example. The amount by which the memory addresses i are shifted is the shift value j. Then, the degree of the correlation between the two pieces of image data is judged based on the sum total of differences between corresponding pixel values, for example. Incidentally, a ratio between corresponding pixel values is usable instead of the difference between corresponding pixel values.

As shown in FIG. 8(a), the control unit 180 calculates a sum total f(0) of differences in a case where the image data stored in the buffer memory 1813 is shifted in the +x-axis direction by 0 pixel units as a first calculation result, for example. The "0 pixel units" means a case where the shift value j is zero (j=0).

$$f(0) = \sum_{i=1}^{n} |M1(i) - Mbuf(i-0)| \quad (1)$$

As shown in FIG. 8(b), the control unit 180 calculates a sum total f(1) of differences in a case where the image data stored in the buffer memory 1813 is shifted in the +x-axis direction by 1 pixel unit as a second calculation result, for example. The "1 pixel unit" means a case where the shift value j is 1 (j=1).

$$f(1) = \sum_{i=1}^{n} |M1(i) - Mbuf(i-1)| \quad (2)$$

As shown in FIG. 8(c), the control unit 180 calculates a sum total f(2) of differences in a case where the image data stored in the buffer memory 1813 is shifted in the +x-axis direction by 2 pixel units as a third calculation result, for example. The "2 pixel units" means a case where the shift value j is 2 (j=2).

$$f(2) = \sum_{i=1}^{n} |M1(i) - Mbuf(i-2)| \quad (3)$$

As shown in FIG. 8(d), the control unit 180 calculates a sum total f(3) of differences in a case where the image data stored in the buffer memory 1813 is shifted in the +x-axis direction by 3 pixel units as a fourth calculation result, for example. The "3 pixel units" means a case where the shift value j is 3 (j=3).

$$f(3) = \sum_{i=1}^{n} |M1(i) - Mbuf(i-3)| \quad (4)$$

The control unit 180 obtains the first to j-th calculation results by repeating these operations. Then, the control unit 180 detects the shift value j that minimizes f(j) by comparing the obtained first to j-th calculation results. The control unit 180 judges that the shift value j minimizing the sum total f(j) of differences is the shift amount S with the strongest correlation, for example. The control unit 180 judges that the shift amount S judged to be with the strongest correlation is the movement amount (wobble amount) of the image data. The "strongest correlation" means that the value f(j) indicating the correlation hits the minimum.

In this case, let n represent the number of pixels used for the difference calculation of the first and second linear image sensors 160 and 170 and j represent a relative pixel position, the value f(j) indicating the correlation can be represented by the following expressions (5) and (6). The relative pixel position j is a displacement amount of the comparative image data from the reference image data. The relative pixel position j is the aforementioned shift value j. Incidentally, in FIG. 7 in the first embodiment, the value f(j) is represented by the sum total f(2) of differences between the two pieces of image data, for example.

$$f(j) = \sum_{i=1}^{n} |M1(i) - Mbuf(i-j)| \quad (5)$$

$$Mbuf(i) = 0 (i < 1, n < i) \quad (6)$$

In the case of FIG. 8(d), for example, the shift value j equals 3, and thus the difference is obtained between the value at the memory address 1 of the buffer memory 1813 and the value at the memory address 4 of the memory #1 or the memory #2.

Figure 9:
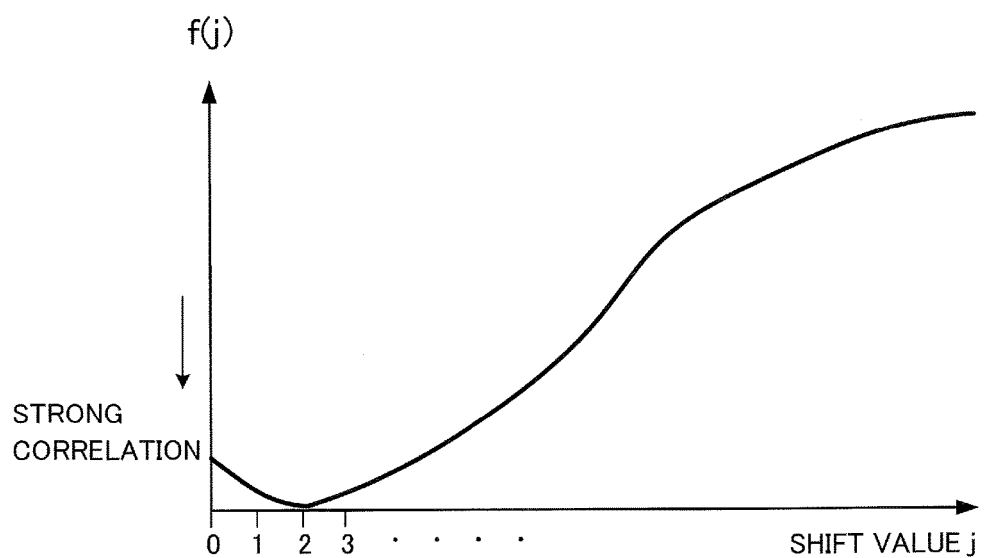
FIG. 9 is a graph showing an example of a relationship between a distance by which image data is shifted (shift distance of the image data) and a value indicating calculated correlation in the correlation calculation performed by the control unit of the wobble detection device according to the first embodiment.

FIG. 9 is a graph showing a relationship between the distance by which the image data is shifted (shift distance) and the value f(j) indicating the calculated correlation in the correlation calculation described above. The horizontal axis represents the shift value j and the vertical axis represents the value f(j) indicating the correlation.

As shown in FIG. 9, it can be understood that the value f(j) indicating the correlation hits the minimum at the point where the shift distance equals the distance S. This means that movement (wobble) of the image in the +x-axis direction for the distance S occurred during the time ΔT.

In FIG. 9, at the shift value j=2, the value f(2) indicating the correlation is the minimum value. Accordingly, movement of the image for the distance corresponding to two photoreceptor elements 160a, 170a has occurred on the photoreceiving surface 141.

The dimension of one photoreceptor element 160a, 170a in the x-axis direction (main scanning direction) will be referred to as a length WPx. The distance S of the movement of the image on the photoreceiving surface 141, in the case where the value f(2) indicating the correlation hits the minimum at a shift value j=n, is represented by the following expression (7):

$$S = n \times WPx \quad (7)$$

By the correlation calculation described above, the movement amount (wobble amount) of the image on the image sensor 160, 170 in the time ΔT can be detected. Accordingly, the movement amount (wobble amount) of the test object 110 on the transfer line in the time ΔT can be detected. Further, by periodically repeating the above-described correlation calculation, the movement amount (wobble amount) of the test object 110 on the transfer line can be detected periodically, for example.

Incidentally, the correlation calculation is not limited to calculation according to the expression (5). The correlation calculation may employ a different operational expression as long as the operation is capable of calculating a value indicating correlation between the comparative image data stored in the buffer memory 1813 and the reference image data stored in the memory #1 (or the memory #2). For example, a value f(j) indicating the correlation can be obtained by calculating the ratio between the signal intensity M1(i) and the signal intensity Mbuf(i+j).

(1-2) Effect

As described above, with the wobble detection device 100 according to the first embodiment, detection accuracy of the x-axis direction movement amount (wobble amount) of the test object 110 being transferred in the transfer direction DO can be increased by performing the correlation calculation in regard to the reference image data outputted from the first linear image sensor 160 and the comparative image data outputted from the second linear image sensor 170.

The calculation of the wobble amount can be performed repeatedly at a certain cycle. Thus, even in cases where a plurality of test objects 110 are transferred successively, the detection accuracy of the wobble of the test objects 110 being transferred with respect to the image pickup equipment can be increased.

(2) Second Embodiment (2-1) Configuration

In the first embodiment, a case where the line scan camera 140 includes the first linear image sensor 160 and the second linear image sensor 170 was described.

On the other hand, a line scan camera 240 of a wobble detection device 200 according to a second embodiment of the present invention includes a first linear image sensor 260 having a plurality of first photoreceptor elements 260a arranged in the x-axis direction, a second linear image sensor 270 having a plurality of second photoreceptor elements 270a arranged in the x-axis direction, and a third linear image sensor 265 disposed between the first linear image sensor 260 and the second linear image sensor 270 and having a plurality of third photoreceptor elements 265a arranged in the x-axis direction.

Even if the two line sensors described in the Patent Reference 1 are arranged side by side in the auxiliary scanning direction, for example, increasing the size of each photoreceptor element of the linear image sensors in order to improve photoreception sensitivity leads to an increase of a cyclic period of performing the wobble detection. For example, if the length Wy shown in FIG. 2 is increased, the interval between the first linear image sensor 160 and the second linear image sensor 170 in the y-axis direction increases. Accordingly, the interval between the time of detection by the first linear image sensor 160 and the time of detection by the second linear image sensor 170 increases.

Further, if the size of each photoreceptor element in the x-axis direction is increased, for example, the resolution at the time of the image scan decreases. Accordingly, the detection accuracy of the wobble amount decreases.

The wobble detection device 200 according to the second embodiment is capable of inhibiting the decrease in the detection accuracy of the wobble amount even when the amount of light from the object is small. Namely, the wobble detection device 200 according to the second embodiment is capable of inhibiting the increase of the cyclic period of detecting the wobble amount even when the amount of light from the object is small. Further, the wobble detection device 200 according to the second embodiment is capable of inhibiting the decrease in the resolution at the time of detecting the wobble amount even when the amount of light from the object is small.

The first linear image sensor 260 includes the first photoreceptor elements 260a. The first linear image sensor 260 is provided with a plurality of first photoreceptor elements 260a. The first photoreceptor elements 260a are arranged in the x-axis direction (main scanning direction), for example.

The second linear image sensor 270 includes the second photoreceptor elements 270a. The second linear image sensor 270 is provided with a plurality of second photoreceptor elements 270a. The second photoreceptor elements 270a are arranged in the x-axis direction (main scanning direction), for example.

The third linear image sensor 265 includes the third photoreceptor elements 265a. The third linear image sensor 265 is provided with a plurality of third photoreceptor elements 265a. The third photoreceptor elements 265a are arranged in the x-axis direction (main scanning direction), for example.

The third linear image sensor 265 is disposed between the first linear image sensor 260 and the second linear image sensor 270 in the y-axis direction (auxiliary scanning direction). The first linear image sensor 260, the second linear image sensor 270 and the third linear image sensor 265 are arranged so that their corresponding pixels coincide with each other in the main scanning direction (X-axis). The "corresponding pixels" mean pixels corresponding to the same memory address i, for example.

In the second embodiment, a first image pickup unit 26 includes the first linear image sensor 260 and the third linear image sensor 265. A second image pickup unit 27 includes the second linear image sensor 270 and the third linear image sensor 265.

The wobble detection device 200 according to the second embodiment differs from the wobble detection device 100 according to the first embodiment in including the third linear image sensor 265. The third linear image sensor 265 is included in both of the image pickup units: the first image pickup unit 26 and the second image pickup unit 27. In other words, the third linear image sensor 265 is a common component of the first image pickup unit 26 and the second image pickup unit 27.

A sensor unit 20 includes the first linear image sensor 260, the second linear image sensor 270 and the third linear image sensor 265.

Further, in the second embodiment, the length of a first photoreceiving region, as the photoreceiving region of a photoreceiving surface 241 of the first linear image sensor 260 (a plurality of first photoreceptor elements 260a), in the image movement direction DI (first direction) is equal to the length of a second photoreceiving region, as the photoreceiving region of the photoreceiving surface of the second linear image sensor 270 (a plurality of second photoreceptor elements 270a), in the image movement direction DI, and the equal length is the length Wy.

The first photoreceiving region is the photoreceiving region of the photoreceiving surface 241 of the first linear image sensor 260. The plurality of first photoreceptor elements 260a are arranged on the photoreceiving surface 241 of the first linear image sensor 260.

The second photoreceiving region is the photoreceiving region of the photoreceiving surface 241 of the second linear image sensor 270. The plurality of second photoreceptor elements 270a are arranged on the photoreceiving surface 241 of the second linear image sensor 270.

The image movement direction DI is the auxiliary scanning direction. In the second embodiment, the image movement direction DI is the -y-axis direction. The image movement direction DI is the first direction.

The length of the first photoreceiving region in the auxiliary scanning direction is equal to the length of the second photoreceiving region in the auxiliary scanning direction. The length of the first photoreceiving region in the auxiliary scanning direction and the length of the second photoreceiving region in the auxiliary scanning direction are the length Wy.

Furthermore, the length Wy_L of a third photoreceiving region, as the photoreceiving region of the photoreceiving surface of the third linear image sensor 265 (a plurality of third photoreceptor elements 265a), in the image movement direction DI is twice the length Wy of the first photoreceiving region in the image movement direction DI. However, it is sufficient if a relationship Wy<Wy_L exists between the length Wy and the length Wy_L.

The third photoreceiving region is the photoreceiving region of the photoreceiving surface 241 of the third linear image sensor 265. The plurality of third photoreceptor elements 265a are arranged on the photoreceiving surface 241 of the third linear image sensor 265. The length Wy_L of the third photoreceiving region in the auxiliary scanning direction is twice the length Wy, for example.

Incidentally, the length Wy_L may also be equal to the length Wy. The photoreceptor elements 260a, 265a and 270a may have the same photoreception sensitivity. The photoreceptor elements 260a, 265a and 270a may have the same photoreceiving area. The amount of light received by a photoreceptor element can be changed by changing the photoreceiving area. The amount of light received by a photoreceptor element can be changed by providing the photoreceptor element with a lens or the like.

Except these features, the second embodiment is equivalent to the first embodiment. Therefore, the description of the second embodiment will be given mainly of the difference from the first embodiment.

A test object 210, an illumination device 220, an imaging lens 230, a transfer apparatus 250, the first linear image sensor 260, the second linear image sensor 270, the photoreceptor elements 260a and 270a, and the host device 190 in the second embodiment are identical with the test object 110, the illumination device 120, the imaging lens 130, the transfer apparatus 150, the first linear image sensor 160, the second linear image sensor 170, the photoreceptor elements 160a and 170a, and the host device 190 in the first embodiment.

Figure 10:
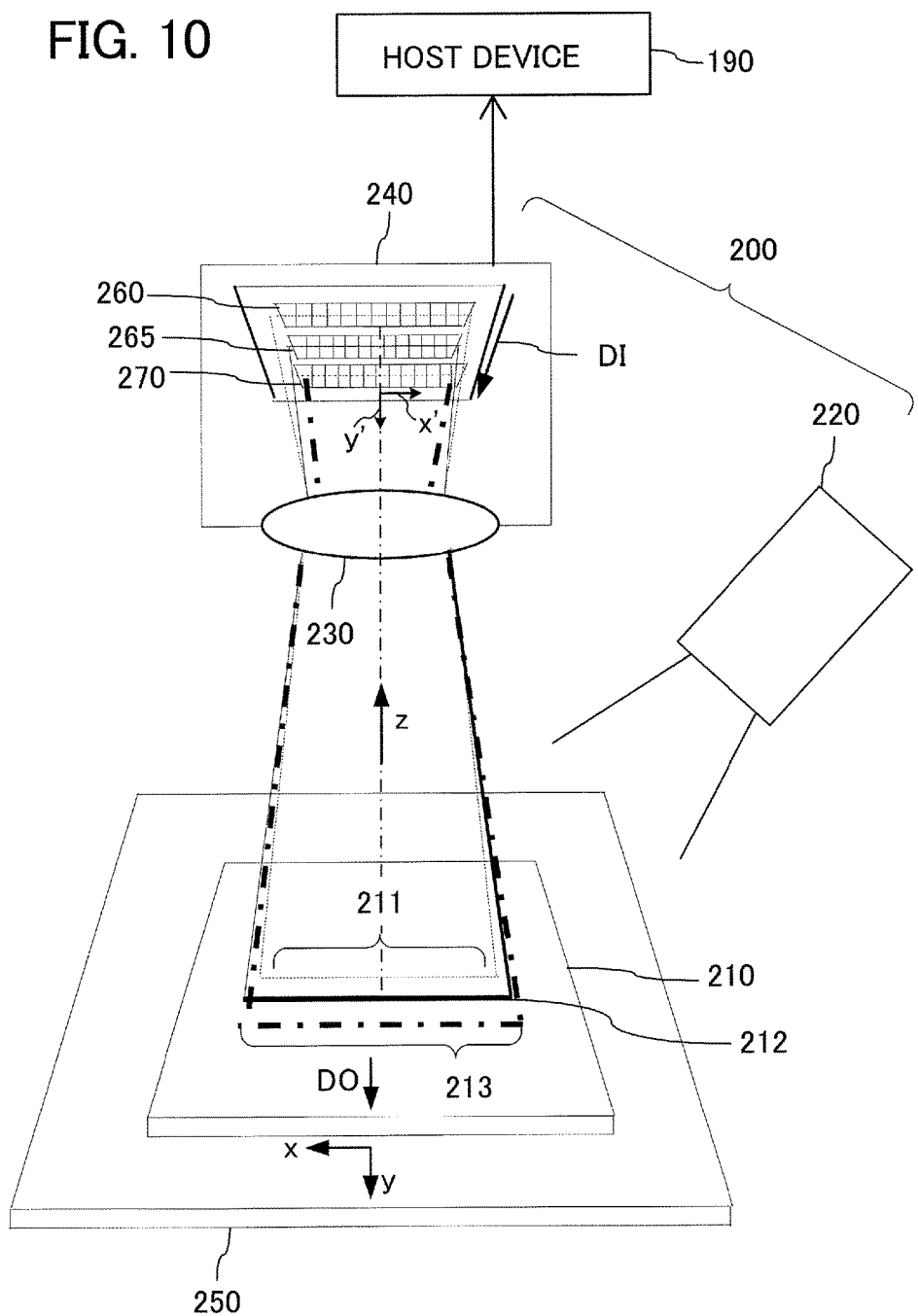
FIG. 10 is a diagram schematically showing a configuration of a wobble detection device according to a second embodiment of the present invention.

FIG. 10 is a diagram schematically showing a configuration of the wobble detection device 200 according to the second embodiment.

As shown in FIG. 10, the wobble detection device 200 includes the line scan camera 240. The wobble detection device 200 can include the illumination device 220 or the imaging lens 230. The illumination device 220 illuminates the test object 210 as the object with light. The imaging lens 230 is an imaging optical system that forms an image of the test object 210.

The line scan camera 240 includes the first linear image sensor 260, the third linear image sensor 265 and the second linear image sensor 270. The first, third and second linear image sensors 260, 265 and 270 are adjacently arranged in this order in the image movement direction DI.

In FIG. 10, the third linear image sensor 265 is disposed on the –y-axis side of the first linear image sensor 260. The second linear image sensor 270 is disposed on the –y-axis side of the third linear image sensor 265. The third linear image sensor 265 is situated adjacent to the first linear image sensor 260. The second linear image sensor 270 is situated adjacent to the third linear image sensor 265.

In the photoreceiving regions of the photoreceiving surface (imaging surface) of the first, third and second linear image sensors 260, 265 and 270, images (image regions) of the test object 210 are formed by the imaging lens 230.

The imaging lens 230 forms an image of the test object 210 on the photoreceiving surface 241 of each linear image sensor 260, 265, 270. A scan object region on the test object 210 corresponds to an image region on the photoreceiving surface 241. Namely, the image of a scan object region on the test object 210 is projected on an image region on the photoreceiving surface 241.

The first, third and second linear image sensors 260, 265 and 270 scan the images (image regions) formed on the photoreceiving regions of the photoreceiving surface 241. The linear image sensors 260, 265 and 270 output image data corresponding to the scanned images.

In FIG. 10, a scan object region 211 indicated by the broken line on the test object 210 represents a region scanned by the first linear image sensor 260. A scan object region 212 indicated by the solid line on the test object 210 represents a region scanned by the third linear image sensor 265. A scan object region 213 indicated by the chain line on the test object 210 represents a region scanned by the second linear image sensor 270.

The first, third and second linear image sensors 260, 265 and 270 successively repeat the image scan and the outputting of the image data. The linear image sensors 260, 265 and 270 repeat the image scan and the outputting of the image data at a certain cycle, for example.

FIG. 11 is a plan view showing the first, third and second linear image sensors 260, 265 and 270.

Each of the first, third and second linear image sensors 260, 265 and 270 includes the plurality of photoreceptor elements 260a, 265a, 270a arranged in the x-axis direction. The linear image sensors 260, 265 and 270 convert one-dimensional image information into analog signals. The linear image sensors 260, 265 and 270 are capable of outputting the analog signals according to a time series.

As shown in FIG. 11, the dimension of the first and second linear image sensors 260 and 270 in the x-axis direction is the length Wx, and their dimension in the transfer direction DO is the length Wy. The dimension of the third linear image sensor 265 in the x-axis direction is the length Wx, and its dimension in the transfer direction DO is the length Wy_L. The relationship Wy<Wy_L holds between the length Wy and the length Wy_L. In the second embodiment, the relationship between the length Wy and the length Wy_L is 2Wy=Wy_L.

Figure 12:
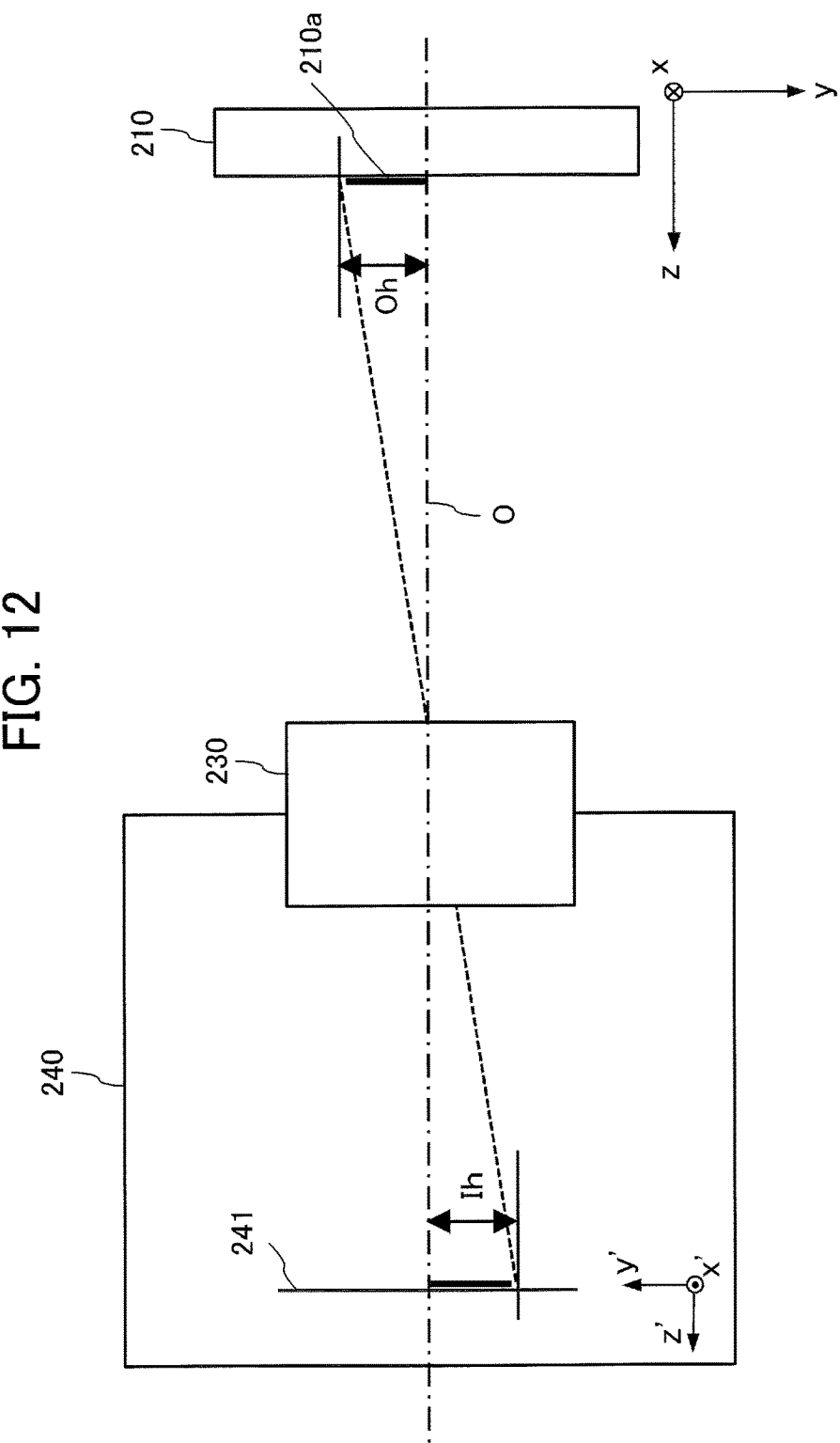
FIG. 12 is a diagram showing a relationship between a scan object region of a test object and an image (image region) formed on a photoreceiving surface (imaging surface) of each of the first to third linear image sensors in the wobble detection device according to the second embodiment.

FIG. 12 is a diagram showing a relationship between the test object 210 and the image formed on the photoreceiving surface 241 of each of the first, third and second linear image sensors 260, 265 and 270.

The imaging lens 230 of the wobble detection device 200 according to the second embodiment is implemented by using a non-magnifying lens, for example. Accordingly, a relationship Oh=Ih holds between a scan height Oh of the test object 210 and the height Ih of the image formed on the photoreceiving surface 241 of the line scan camera 240. Namely, the height Oh equals the height Ih. However, the imaging lens 230 is not limited to non-magnifying lenses.

FIG. 13 is a block diagram schematically showing an example of a configuration of a control system of the wobble detection device 200 according to the second embodiment.

As shown in FIG. 13, the wobble detection device 200 includes a control unit 280, a storage unit 281, the first, second and third linear image sensors 260, 270 and 265, and adders 285 and 286. The wobble detection device 200 can include A/D converters 282, 283 and 284.

The wobble detection device 200 according to the second embodiment differs from the wobble detection device 100 according to the first embodiment in including the adders 285 and 286.

The A/D converters 282, 283 and 284 in the second embodiment are similar to the A/D converters 182 and 183 in the first embodiment.

The first linear image sensor 260 sends data $S_{10}$ to the A/D converter 282. The data $S_{10}$ is the image data obtained by the scan by the first linear image sensor 260. The data $S_{10}$ is an analog signal.

The second linear image sensor 270 sends data $S_{11}$ to the A/D converter 284. The data $S_{11}$ is the image data obtained by the scan by the second linear image sensor 270. The data $S_{11}$ is an analog signal.

The third linear image sensor 265 sends data $S_{12}$ to the A/D converter 283. The data $S_{12}$ is the image data obtained by the scan by the third linear image sensor 265. The data $S_{12}$ is an analog signal.

The A/D converter 282 receives the output signal $S_{10}$ of the first linear image sensor 260. Then, the A/D converter 282 sends an output signal $S_{13}$ to the adder 285. The A/D converter 283 receives the output signal $S_{12}$ of the third linear image sensor 265. Then, the A/D converter 283 sends an output signal $S_{15}$ to the adder 285 and the adder 286. The A/D converter 284 receives the output signal $S_{11}$ of the second linear image sensor 270. Then, the A/D converter 284 sends an output signal $S_{14}$ to the adder 286.

The storage unit 281 in the second embodiment is similar to the storage unit 181 in the first embodiment. Specifically, a memory #1 (first memory 2811) is similar to the memory #1 (first memory 1811). A memory #2 (second memory 2812) is similar to the memory #2 (second memory 1812). A buffer memory 2813 is similar to the buffer memory 1813. Incidentally, the buffer memory 2813 can be left out in cases where a signal $S_{17}$ from the adder 286 is directly sent to the control unit 280 and processed.

Further, the control unit 280 in the second embodiment is similar to the control unit 180 in the first embodiment.

The adder 285 adds the output signal $S_{10}$ of the first linear image sensor 260 and the output signal $S_{12}$ of the third linear image sensor 265 together. In FIG. 13, the adder 285 adds the output signal $S_{13}$ of the A/D converter 282 and the output signal $S_{15}$ of the A/D converter 283 together.

The adder 286 adds the output signal $S_{11}$ of the second linear image sensor 270 and the output signal $S_{12}$ of the third linear image sensor 265 together. In FIG. 13, the adder 286 adds the output signal $S_{14}$ of the A/D converter 284 and the output signal $S_{15}$ of the A/D converter 283 together.

An output signal $S_{16}$ of the adder 285 is sent to the memory #1 (first memory 2811) and the memory #2 (second memory 2812). The output signal $S_{17}$ of the adder 286 is sent to the buffer memory 2813.

The control unit 280 receives data $S_{18}$ from the memory #1 or the memory #2. Here, the data $S_{18}$ is assumed to be identical with the data $S_{16}$ for simplicity of explanation. Further, the control unit 280 receives data $S_{19}$ from the buffer memory 2813. Here, the data $S_{19}$ is assumed to be identical with the data $S_{17}$ for simplicity of explanation.

The control unit 280 performs the correlation calculation by using the data $S_{18}$ and the data $S_{19}$. The control unit 280 determines the wobble amount based on the result of the correlation calculation. Further, the control unit 280 transmits the detected wobble amount to the host device 190. For example, the control unit 280 transmits data $S_{20}$ including the determined wobble amount to the host device 190.

FIG. 14($a$) to FIG. 14($c$) are diagrams showing the movement of the image (image regions) on each of the first, third and second linear image sensors 260, 265 and 270 from a time $T_0$ to a time $T_0+\Delta T$.

FIG. 14($a$) shows the positions of image regions A, B, C, D and E with respect to the linear image sensors 260, 265 and 270 at the time $T_0$. FIG. 14($b$) shows the positions of the image regions A, B, C, D and E with respect to the linear image sensors 260, 265 and 270 at the time $T_0+\Delta T/2$. FIG. 14($c$) shows the positions of the image regions A, B, C, D and E with respect to the linear image sensors 260, 265 and 270 at the time $T_0+\Delta T$.

In FIG. 14($a$) to FIG. 14($c$), the five image regions A, B, C, D and E surrounded by broken lines indicate the image of the test object 210 formed on the photoreceiving surface 241. Thus, the image of the test object 210 formed on the photoreceiving surface 241 will be explained below while dividing the image into the five image regions A, B, C, D and E.

Further, the sensor region filled in with light gray indicates the photoreceiving region of the photoreceiving surface 241 of the first linear image sensor 260. The sensor region filled in with gray of intermediate density indicates the photoreceiving region of the photoreceiving surface 241 of the third linear image sensor 265. The sensor region filled in with dark gray indicates the photoreceiving region of the photoreceiving surface 241 of the second linear image sensor 270.

The test object 210 is transferred in the transfer direction DO (+y-axis direction) in FIG. 10 by the transfer apparatus 250 in a production line. The transfer apparatus 250 is a belt conveyor or the like, for example.

In this case, the test object 210 is transferred in the transfer direction DO at a speed of Wy/$\Delta T$. Due to the transfer of the test object 210 in the transfer direction DO (+y-axis direction), the image regions A, B, C, D and E on the photoreceiving surface 241 move in the image movement direction DI (−y-axis direction) in the order of FIG. 14($a$), FIG. 14($b$) and FIG. 14($c$).

As shown in FIG. 14($a$), at the time $T_0$, the image region D on the photoreceiving surface 241 overlaps with the photoreceiving region of the photoreceiving surface of the first linear image sensor 260 to coincide with the photoreceiving region. In other words, the image region D of the image of the test object 210 is situated on the photoreceiving region of the photoreceiving surface 241 of the first linear image sensor 260.

Further, at the time $T_0$, the image region B and the image region C overlap with the photoreceiving region of the photoreceiving surface 241 of the third linear image sensor 265 to coincide with the photoreceiving region. In other words, at the time $T_0$, the image region B and the image region C of the image of the test object 210 are situated on the photoreceiving region of the photoreceiving surface 241 of the third linear image sensor 265.

Furthermore, at the time $T_0$, the image region A overlaps with the photoreceiving region of the photoreceiving surface 241 of the second linear image sensor 270 to coincide with the photoreceiving region. In other words, at the time $T_0$, the image region A of the image of the test object 210 is situated on the photoreceiving region of the photoreceiving surface 241 of the second linear image sensor 270.

When the time $\Delta T/2$ elapses from the time $T_0$, the image regions A, B, C, D and E move the distance equal to the length Wy/2 in the image movement direction DI from the state shown in FIG. 14($a$).

As shown in FIG. 14($b$), at the time $T_0+\Delta T/2$, the image region D overlaps with both of the photoreceiving region of the photoreceiving surface 241 of the first linear image sensor 260 and the photoreceiving region of the photoreceiving surface 241 of the third linear image sensor 265. Specifically, at the time $T_0+\Delta T/2$, half of the image region D on the −y-axis side is situated at the position of a +y-axis side ¼ of the photoreceiving region of the photoreceiving surface 241 of the third linear image sensor 265. Meanwhile, half of the image region D on the +y-axis side is situated at the position of a −y-axis side ½ of the photoreceiving region of the photoreceiving surface 241 of the first linear image sensor 260.

Further, the image region C overlaps with the photoreceiving region of the photoreceiving surface 241 of the third linear image sensor 265. In other words, the image region C is situated on the photoreceiving region of the photoreceiving surface 241 of the third linear image sensor 265. In FIG. 14(b), in the y-axis direction, the image region C is situated at the center of the photoreceiving region of the photoreceiving surface 241 of the third linear image sensor 265.

Furthermore, the image region B overlaps with both of the photoreceiving region of the photoreceiving surface 241 of the second linear image sensor 270 and the photoreceiving region of the photoreceiving surface 241 of the third linear image sensor 265. Specifically, half of the image region B on the −y-axis side is situated at the position of a +y-axis side ½ of the photoreceiving region of the photoreceiving surface 241 of the second linear image sensor 270. Meanwhile, half of the image region B on the +y-axis side is situated at the position of a −y-axis side ¼ of the photoreceiving region of the photoreceiving surface 241 of the third linear image sensor 265.

Moreover, half of the image region A overlaps with half of the photoreceiving region of the photoreceiving surface 241 of the second linear image sensor 270. Specifically, half of the image region A on the +y-axis side is situated at the position of a −y-axis side ½ of the photoreceiving region of the photoreceiving surface 241 of the second linear image sensor 270.

When the time $\Delta T/2$ elapses further from the time $T_0 + \Delta T/2$, the image regions A, B, C, D and E move the distance equal to the length $W_y/2$ in the image movement direction DI from the state shown in FIG. 14(b).

As shown in FIG. 14(c), at the time $T_0 + \Delta T$, the image region C and the image region D overlap with the photoreceiving region of the photoreceiving surface of the third linear image sensor 265 to coincide with the photoreceiving region. In other words, at the time $T_0 + \Delta T$, the image region C and the image region D of the image of the test object 210 are situated on the photoreceiving region of the photoreceiving surface 241 of the third linear image sensor 265.

Further, the image region B overlaps with the photoreceiving region of the photoreceiving surface of the second linear image sensor 270 to coincide with the photoreceiving region. In other words, the image region B is situated on the photoreceiving region of the photoreceiving surface 241 of the second linear image sensor 270.

Furthermore, the image region E overlaps with the photoreceiving region of the photoreceiving surface of the first linear image sensor 260 to coincide with the photoreceiving region. In other words, the image region E is situated on the photoreceiving region of the photoreceiving surface 241 of the first linear image sensor 260.

As above, with the elapse of the time $\Delta T$, the image regions A, B, C, D and E move the distance equal to the length $W_y$ from the state shown in FIG. 14(a) to the state shown in FIG. 14(c).

Figure 15A:
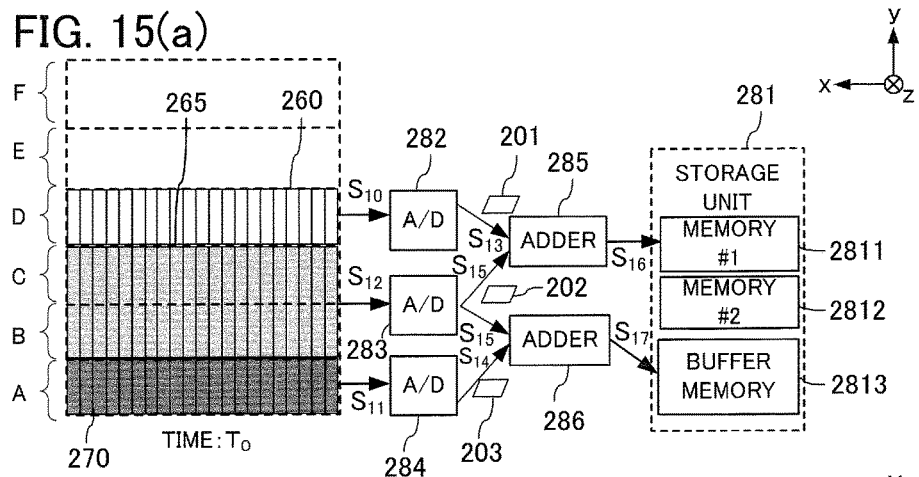
FIG. 15(a) to FIG. 15(c) are diagrams showing the flow of a process in which a control unit of the wobble detection device according to the second embodiment performs the correlation calculation by using image data outputted from the first to third linear image sensors.
Figure 15B:
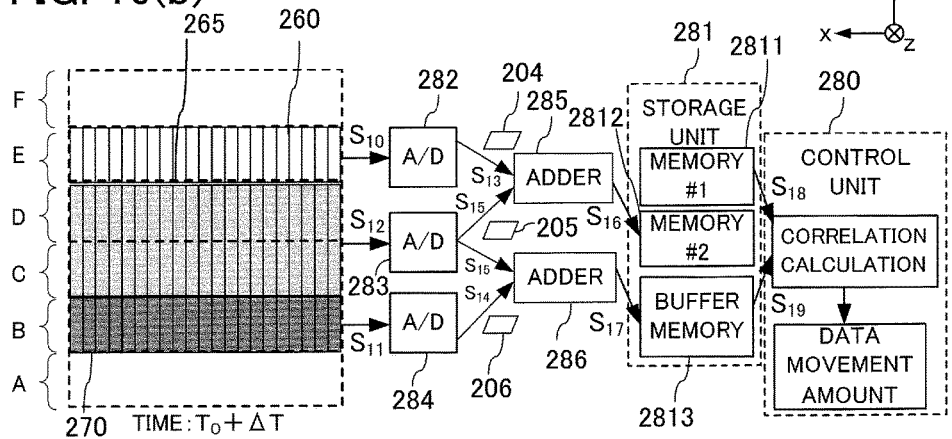
Figure 15C:
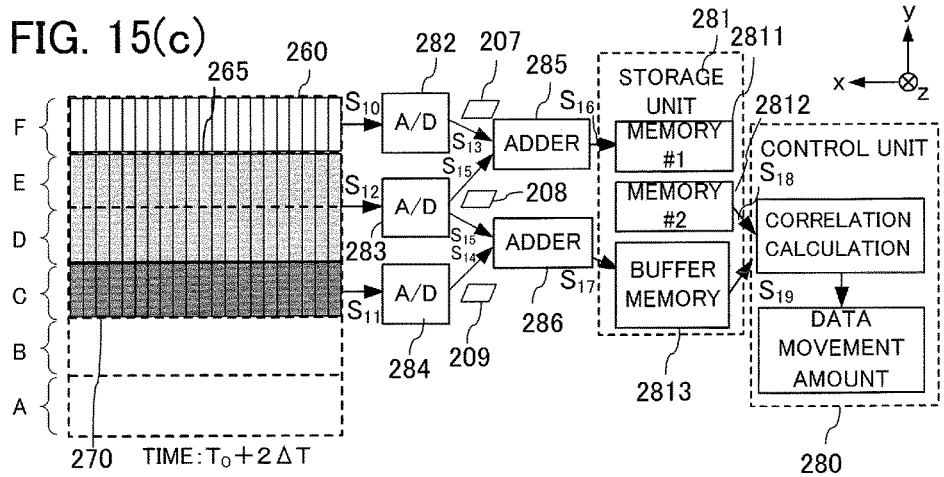

FIG. 15(a) to FIG. 15(c) are diagrams showing the flow of a process for image data outputted from the first, third and second linear image sensors 260, 265 and 270 from the time $T_0$ to the time $T_0 + 2\Delta T$.

Each piece of data processed will be assigned the reference character shown in FIG. 15 as well as the reference character shown in FIG. 13 in the parenthesized style.

As shown in FIG. 15(a), at the time $T_0$, the image region D overlaps with the photoreceiving region of the photoreceiving surface of the first linear image sensor 260 to coincide with the photoreceiving region. In other words, the image region D is situated on the photoreceiving region of the photoreceiving surface 241 of the first linear image sensor 260.

The first linear image sensor 260 scans the image in the image region D. Then, the first linear image sensor 260 outputs image data 201 (data $S_{10}$) corresponding to the image region D.

The A/D converter 282 receives the image data 201 (data $S_{10}$) outputted from the first linear image sensor 260. The outputted image data 201 (data $S_{10}$) is converted by the A/D converter 282 into a digital signal. The image data 201 converted into the digital signal (data $S_{13}$) is added by the adder 285 to image data 202 which will be explained later. The image data 201 and 202 added together (data $S_{16}$) is stored in the memory #1 of the storage unit 281.

Further, at the time $T_0$, the image region B and the image region C overlap with the photoreceiving region of the photoreceiving surface 241 of the third linear image sensor 265 to coincide with the photoreceiving region. In other words, the image region B and the image region C are situated on the photoreceiving region of the photoreceiving surface 241 of the third linear image sensor 265.

The third linear image sensor 265 scans the image in the image region B and the image region C. Then, the third linear image sensor 265 outputs image data 202 (data $S_{12}$) corresponding to the image region B and the image region C.

The A/D converter 283 receives the image data 202 (data $S_{12}$) outputted from the third linear image sensor 265. The outputted image data 202 (data $S_{12}$) is converted by the A/D converter 283 into a digital signal. The image data 202 converted into the digital signal (data $S_{15}$) is added by the adder 285 to the image data 201 (data $S_{13}$). The image data 201 and 202 added together (data $S_{16}$) is stored in the memory #1 of the storage unit 281. Further, the image data 202 (data $S_{15}$) is added to image data 203 (data $S_{14}$) which will be explained later. The image data 202 and 203 added together (data $S_{17}$) is stored in the buffer memory 2813 of the storage unit 281.

Furthermore, at the time $T_0$, the image region A overlaps with the photoreceiving region of the photoreceiving surface of the second linear image sensor 270 to coincide with the photoreceiving region. In other words, the image region A is situated on the photoreceiving region of the photoreceiving surface 241 of the second linear image sensor 270.

The second linear image sensor 270 scans the image in the image region A. Then, the second linear image sensor 270 outputs image data 203 (data $S_{11}$) corresponding to the image region A.

The A/D converter 284 receives the image data 203 (data $S_{11}$) outputted from the second linear image sensor 270. The outputted image data 203 (data $S_{11}$) is converted by the A/D converter 284 into a digital signal. The image data 203 converted into the digital signal (data $S_{14}$) is added by the adder 286 to the image data 202 (data $S_{15}$). The image data 202 and 203 added together (data $S_{17}$) is stored in the buffer memory 2813 of the storage unit 281.

As shown in FIG. 15(b), at the time $T_0 + \Delta T$, the image region E overlaps with the photoreceiving region of the photoreceiving surface of the first linear image sensor 260 to coincide with the photoreceiving region. In other words, the image region E is situated on the photoreceiving region of the photoreceiving surface 241 of the first linear image sensor 260.

The first linear image sensor 260 scans the image in the image region E. Then, the first linear image sensor 260 outputs image data 204 (data $S_{10}$) corresponding to the image region E.

The A/D converter 282 receives the image data 204 (data $S_{10}$) outputted from the first linear image sensor 260. The outputted image data 204 (data $S_{10}$) is converted by the A/D converter 282 into a digital signal. The image data 204 converted into the digital signal (data $S_{13}$) is added by the adder 285 to image data 205 (data $S_{15}$) which will be explained later. The image data 204 and 205 added together (data $S_{16}$) is stored in the memory #2 of the storage unit 281.

Further, at the time $T_0+\Delta T$, the image region C and the image region D overlap with the photoreceiving region of the photoreceiving surface of the third linear image sensor 265 to coincide with the photoreceiving region. In other words, the image region C and the image region D are situated on the photoreceiving region of the photoreceiving surface 241 of the third linear image sensor 265.

The third linear image sensor 265 scans the image in the image region C and the image region D. Then, the third linear image sensor 265 outputs image data 205 (data $S_{12}$) corresponding to the image region C and the image region D.

The A/D converter 283 receives the image data 205 (data $S_{12}$) outputted from the third linear image sensor 265. The outputted image data 205 (data $S_{12}$) is converted by the A/D converter 283 into a digital signal. The image data 205 converted into the digital signal (data $S_{15}$) is added by the adder 285 to the image data 204 (data $S_{13}$). The image data 204 and 205 added together (data $S_{16}$) is stored in the memory #2 of the storage unit 281. Further, the image data 205 (data $S_{15}$) is added to image data 206 (data $S_{14}$) which will be explained later. The image data 205 and 206 added together (data $S_{17}$) is stored in the buffer memory 2813 of the storage unit 281.

Furthermore, at the time $T_0+\Delta T$, the image region B overlaps with the photoreceiving region of the photoreceiving surface of the second linear image sensor 270 to coincide with the photoreceiving region. In other words, the image region B is situated on the photoreceiving region of the photoreceiving surface 241 of the second linear image sensor 270.

The second linear image sensor 270 scans the image in the image region B. Then, the second linear image sensor 270 outputs image data 206 (data $S_{11}$) corresponding to the image region B.

The A/D converter 284 receives the image data 206 (data $S_{11}$) outputted from the second linear image sensor 270. The outputted image data 206 (data $S_{11}$) is converted by the A/D converter 284 into a digital signal. The image data 206 converted into the digital signal (data $S_{14}$) is added by the adder 286 to the image data 205 (data $S_{15}$). The image data 205 and 206 added together (data $S_{17}$) is stored in the buffer memory 2813 of the storage unit 281.

As above, in the memory #1, summation data (data $S_{16}$) of the image data 201 and 202 of the image region B, the image region C and the image region D at the time $T_0$ is stored. In the buffer memory 2813, summation data (data $S_{17}$) of the image data 205 and 206 of the image region B, the image region C and the image region D at the time $T_0+\Delta T$ is stored.

The control unit 280 performs the correlation calculation in regard to the summation data of the image data 201 and 202 of the image region B, the image region C and the image region D stored in the memory #1 (data $S_{18}$) and the summation data of the image data 205 and 206 of the image region B, the image region C and the image region D stored in the buffer memory 2813 (data $S_{19}$).

The control unit 280 performs the correlation calculation in regard to the summation data (data $S_{18}$) of the image data 201 and 202 and the summation data (data $S_{19}$) of the image data 205 and 206. The summation data (data $S_{18}$) of the image data 201 and 202 is image data of the image region B, the image region C and the image region D. The summation data (data $S_{18}$) of the image data 201 and 202 has been stored in the memory #1. The summation data (data $S_{19}$) of the image data 205 and 206 is image data of the image region B, the image region C and the image region D. The summation data (data $S_{19}$) of the image data 205 and 206 has been stored in the buffer memory 2813.

Then, the control unit 280 calculates the movement amount (wobble amount) of the image data in the x-axis direction in the time $\Delta T$. The method of the correlation calculation in the second embodiment is the same as the method described in the first embodiment.

As shown in FIG. 15(c), at the time $T_0+2\Delta T$, the image region F overlaps with the photoreceiving region of the photoreceiving surface of the first linear image sensor 260 to coincide with the photoreceiving region. In other words, the image region F is situated on the photoreceiving region of the photoreceiving surface 241 of the first linear image sensor 260.

The first linear image sensor 260 scans the image in the image region F. Then, the first linear image sensor 260 outputs image data 207 (data $S_{10}$) corresponding to the image region F.

The A/D converter 282 receives the image data 207 (data $S_{10}$) outputted from the first linear image sensor 260. The outputted image data 207 (data $S_{10}$) is converted by the A/D converter 282 into a digital signal. The image data 207 converted into the digital signal (data $S_{13}$) is added by the adder 285 to image data 208 (data $S_{15}$) which will be explained later. The image data 207 and 208 added together (data $S_{16}$) is stored in the memory #1 of the storage unit 281.

Further, at the time $T_0+2\Delta T$, the image region D and the image region E overlap with the photoreceiving region of the photoreceiving surface of the third linear image sensor 265 to coincide with the photoreceiving region. In other words, the image region D and the image region E are situated on the photoreceiving region of the photoreceiving surface 241 of the third linear image sensor 265.

The third linear image sensor 265 scans the image in the image region D and the image region E. Then, the third linear image sensor 265 outputs image data 208 (data $S_{12}$) corresponding to the image region D and the image region E.

The A/D converter 283 receives the image data 208 (data $S_{12}$) outputted from the third linear image sensor 265. The outputted image data 208 (data $S_{12}$) is converted by the A/D converter 283 into a digital signal. The image data 208 converted into the digital signal (data $S_{15}$) is added by the adder 285 to the image data 207 (data $S_{13}$). The image data 207 and 208 added together (data $S_{16}$) is stored in the memory #1 of the storage unit 281. Further, the image data 208 (data $S_{15}$) is added to image data 209 (data $S_{14}$) which will be explained later. The image data 208 and 209 added together (data $S_{17}$) is stored in the buffer memory 2813 of the storage unit 281.

Furthermore, at the time $T_0+2\Delta T$, the image region C overlaps with the photoreceiving region of the photoreceiving surface of the second linear image sensor 270 to coincide with the photoreceiving region. In other words, the image region C is situated on the photoreceiving region of the photoreceiving surface 241 of the second linear image sensor 270.

The second linear image sensor 270 scans the image in the image region C. Then, the second linear image sensor 270 outputs image data 209 (data $S_{11}$) corresponding to the image region C.

The A/D converter 284 receives the image data 209 (data $S_{11}$) outputted from the second linear image sensor 270. The outputted image data 209 (data $S_{11}$) is converted by the A/D converter 284 into a digital signal. The image data 209 converted into the digital signal (data $S_{14}$) is added by the adder 286 to the image data 208 (data $S_{15}$). The image data 208 and 209 added together (data $S_{17}$) is stored in the buffer memory 2813 of the storage unit 281.

Subsequently, the correlation calculation is performed in regard to the summation data of the image data 204 and 205 of the image region C, the image region D and the image region E stored in the memory #2 (data $S_{18}$) and the summation data of the image data 208 and 209 of the image region B, the image region C and the image region D stored in the buffer memory 2813 (data $S_{19}$).

The control unit 280 performs the correlation calculation in regard to the summation data (data $S_{18}$) of the image data 204 and 205 and the summation data (data $S_{19}$) of the image data 208 and 209. The summation data (data $S_{18}$) of the image data 204 and 205 is image data of the image region C, the image region D and the image region E. The summation data (data $S_{18}$) of the image data 204 and 205 has been stored in the memory #2. The summation data (data $S_{19}$) of the image data 208 and 209 is image data of the image region C, the image region D and the image region E. The summation data (data $S_{19}$) of the image data 208 and 209 has been stored in the buffer memory 2813.

Then, the control unit 280 calculates the movement amount (wobble amount) of the image data in the x-axis direction in the time ΔT. Thereafter, according to the same method, the control unit 280 performs the correlation calculation between the image data stored in the buffer memory 2813 (comparative image data) and the image data stored in the memory #1 or the memory #2 one cycle (time ΔT) earlier (reference image data). The control unit 280 successively calculates the movement amount (wobble amount) of the image data in the x-axis direction according to the correlation calculation. The method of the correlation calculation is the same as the method described in the first embodiment.

(2-2) Effect

As described above, with the wobble detection device 200 according to the second embodiment, the correlation calculation is performed in regard to the reference image data outputted from the first linear image sensor 260 and the third linear image sensor 265 and the comparative image data outputted from the second linear image sensor 270 and the third linear image sensor 265.

In short, the wobble detection device 200 performs the correlation calculation by using the reference image data and the comparative image data. The reference image data is image data outputted from the first linear image sensor 260 and the third linear image sensor 265. The comparative image data is image data outputted from the second linear image sensor 270 and the third linear image sensor 265.

The calculation of the wobble amount can be performed repeatedly at a certain cycle. Thus, even in cases where a plurality of test objects 210 are transferred successively, for example, the detection accuracy of the wobble of the transferred test objects 210 with respect to the image pickup equipment can be increased.

In the wobble detection device 200 according to the second embodiment, the length Wy_L of the photoreceiving region of the photoreceiving surface 241 of the third linear image sensor 265 in the image movement direction DI is set longer than the length Wy of the photoreceiving region of the photoreceiving surface 241 of the first/second linear image sensor 260, 270 in the image movement direction DI.

Namely, in the y-axis direction (auxiliary scanning direction), the length Wy_L of the third linear image sensor 265 is longer than the length Wy of the linear image sensor 260, 270.

Therefore, the amount of light incident on the third linear image sensor 265 is made large. The wobble detection device 200 is capable of carrying out the detection with increased accuracy without decreasing the detection frequency. The detection frequency is the number of times of the wobble detection per unit time. Here, the "accuracy" means that the S/N ratio is high, for example. The S/N ratio is the signal-to-noise ratio.

Accordingly, the wobble detection device 200 according to the second embodiment is capable of further increasing the detection accuracy of the x-axis direction movement amount (wobble amount) of the test object 210 being transferred in the transfer direction DO in comparison with the wobble detection device 100 according to the first embodiment.

(3) Third Embodiment (3-1) Configuration

Figure 16:
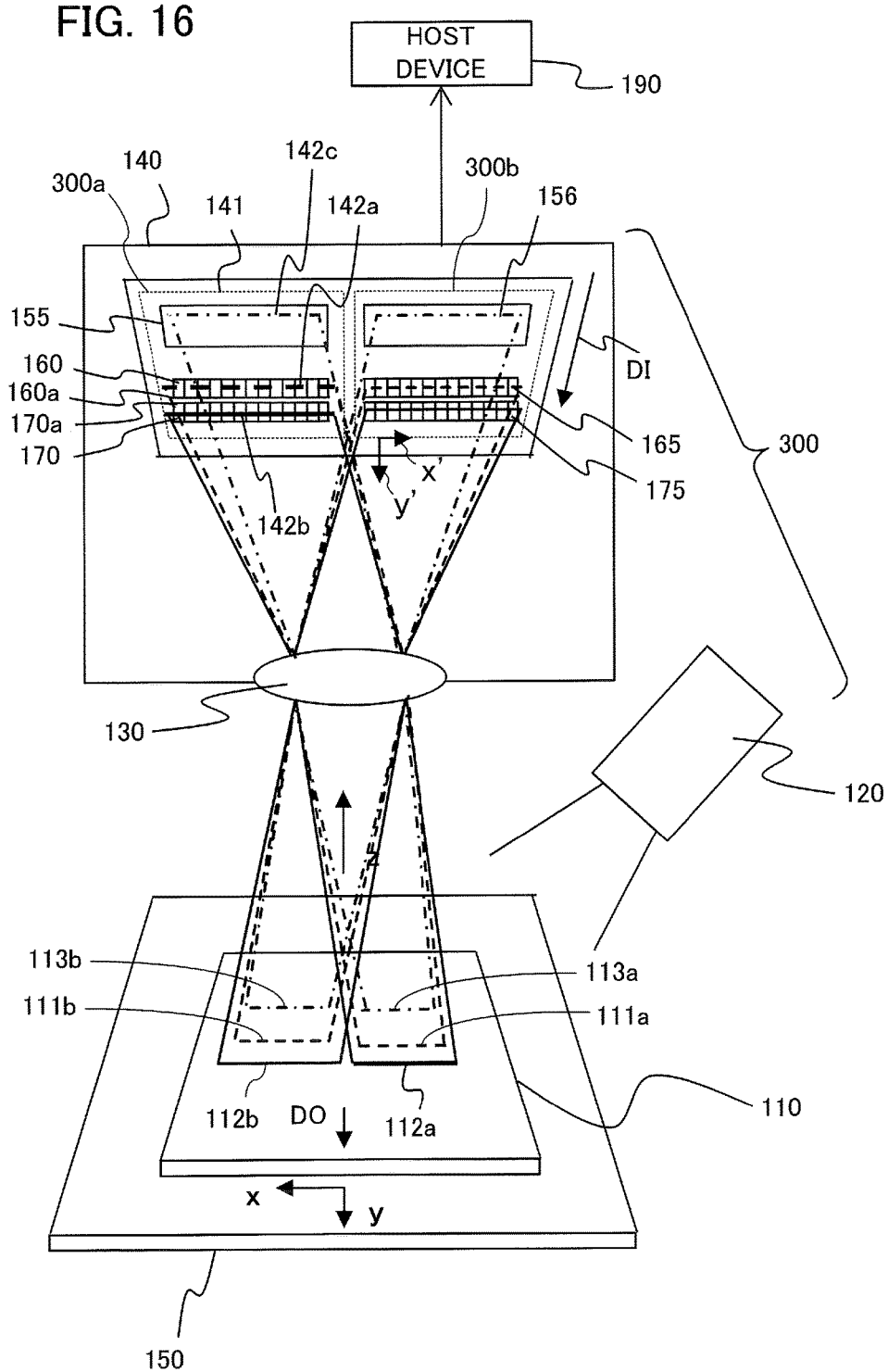
FIG. 16 is a diagram schematically showing a configuration of a wobble detection device according to a third embodiment of the present invention.
Figure 17:
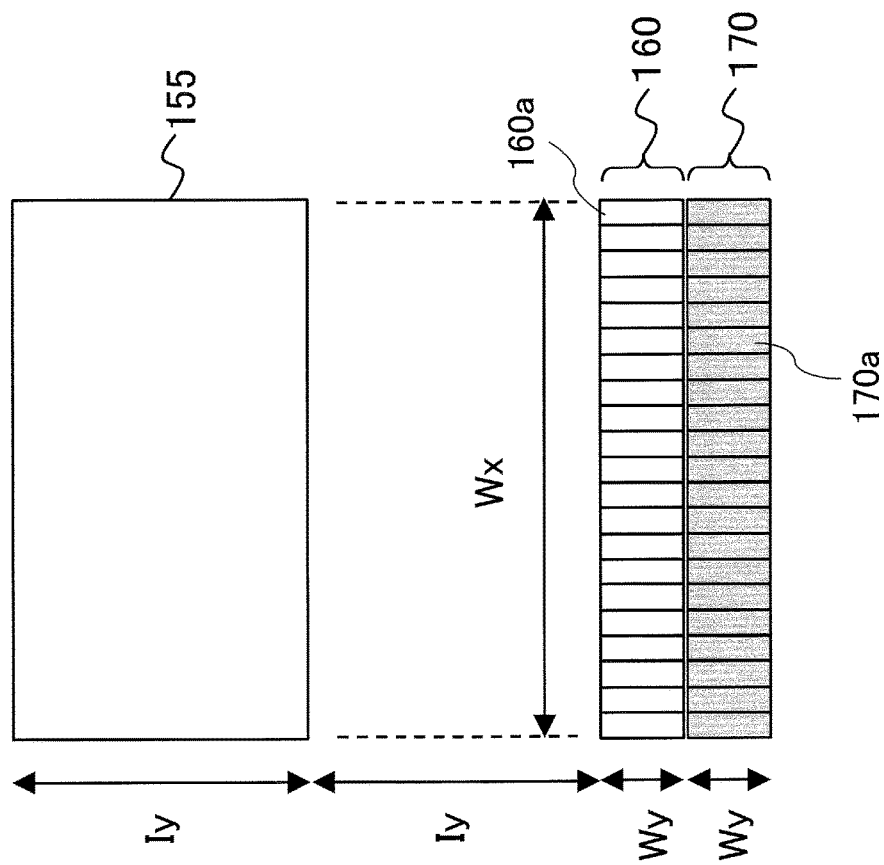
FIG. 17 is a plan view schematically showing a configuration of a light amount sensor and first and second linear image sensors in the wobble detection device according to the third embodiment.
Figure 18:
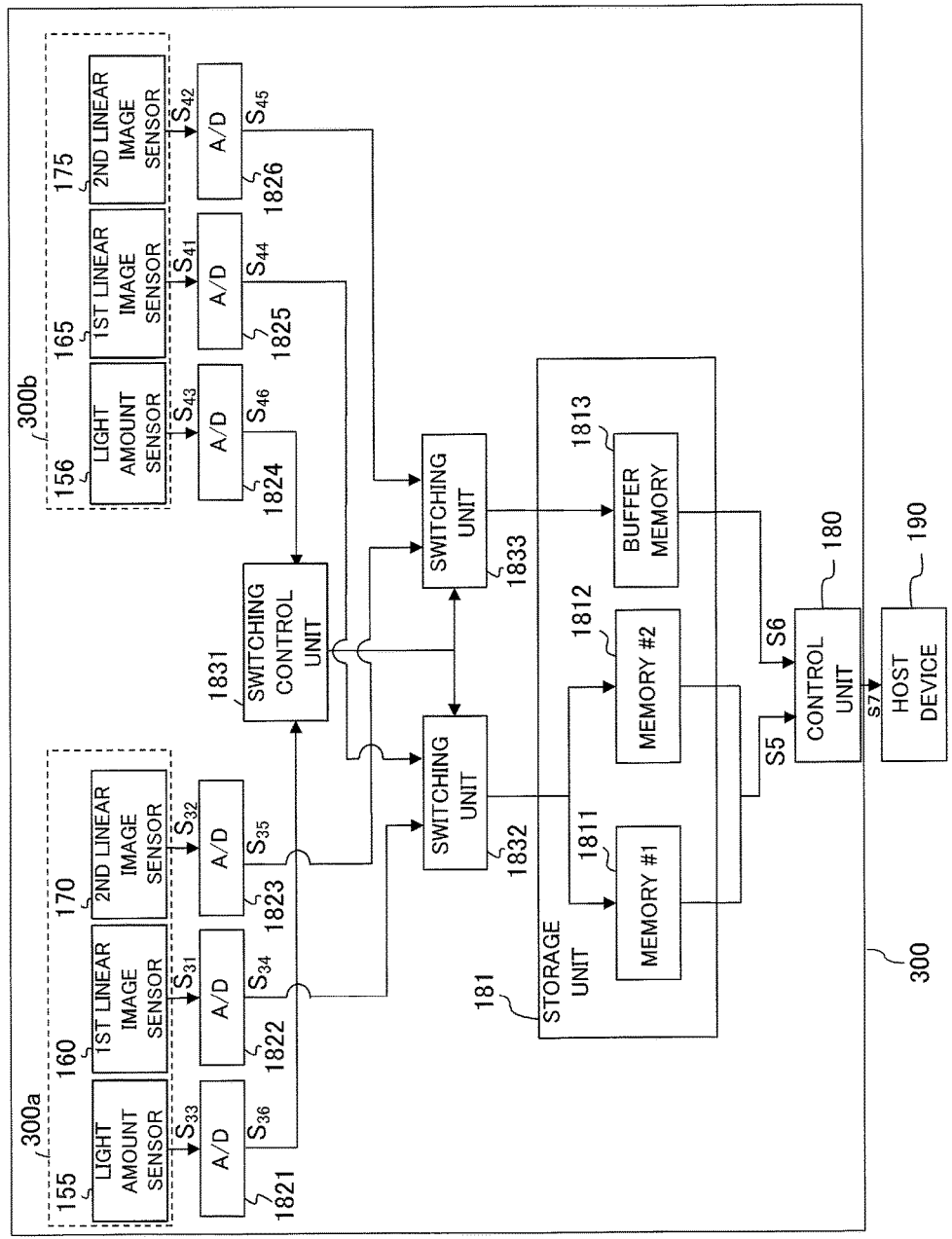
FIG. 18 is a block diagram schematically showing an example of a configuration of a control system of the wobble detection device according to the third embodiment.

FIG. 16 is a diagram schematically showing a configuration of a wobble detection device 300 according to a third embodiment of the present invention. FIG. 17 is a plan view schematically showing a configuration of a light amount sensor 155 and first and second linear image sensors 160 and 170 in the third embodiment. FIG. 18 is a block diagram schematically showing an example of a configuration of a control system of the wobble detection device 300 according to the third embodiment.

The wobble detection device 300 according to the third embodiment differs from the wobble detection device 100 according to the first embodiment in including a first wobble detection sensor 300a and a second wobble detection sensor 300b.

For example, when an extreme brightness difference has occurred in a part of the object, the device described in the Patent Reference 1 sets the sensor gain at a low level so that the image of a bright part will not be saturated. In this case, the image of a dark part of the object is necessitated to be dark due to the low gain. Accordingly, the area of the image usable for the wobble detection decreases. In contrast, if the sensor gain is set at a high level to suit the dark part, the image of the bright part is saturated and blown out to white. Accordingly, the area of the image usable for the wobble detection decreases. As above, there is a problem in that the accuracy of the wobble detection decreases due to the decrease in the area of the image usable for the wobble detection.

The wobble detection device 300 according to the third embodiment is capable of inhibiting the decrease in the wobble detection accuracy even when a brightness difference has occurred in a part of the object.

As shown in FIG. 16, the wobble detection device 300 according to the third embodiment includes the first wobble detection sensor 300a and the second wobble detection sensor 300b. The first wobble detection sensor 300a and the second wobble detection sensor 300b include a plurality of linear image sensors 160, 170, 175 and 165 and light amount sensors 155 and 156.

The first wobble detection sensor 300a is a first sensor unit. The second wobble detection sensor 300b is a second sensor unit. The first wobble detection sensor 300a (first sensor unit) includes the linear image sensors 160 and 170 and the light amount sensor 155. The second wobble detection sensor 300b (second sensor unit) includes the linear image sensors 175 and 165 and the light amount sensor 156.

With this configuration, the wobble detection device 300 is capable of detecting the movement of the test object 110 in the main scanning direction while selecting a bright part of the test object 110. Further, the gain of the linear image sensors 160, 170, 175 and 165 can be set at a low level. Therefore, the test object 110 can be detected by using low noise images. Accordingly, detection accuracy of the test object 110 can be increased.

As shown in FIG. 16, the line scan camera 140 includes the first wobble detection sensor 300a and the second wobble detection sensor 300b.

The first wobble detection sensor 300a includes the light amount sensor 155, the first linear image sensor 160 and the second linear image sensor 170. The light amount sensor 155 is a first light amount sensor. The first linear image sensor 160 is a first image pickup unit. The second linear image sensor 170 is a second image pickup unit.

The second wobble detection sensor 300b includes the light amount sensor 156, the first linear image sensor 165 and the second linear image sensor 175. The light amount sensor 156 is a second light amount sensor. The first linear image sensor 165 is a third image pickup unit. The second linear image sensor 175 is a fourth image pickup unit.

As shown in FIG. 16, the first and second wobble detection sensors 300a and 300b are arranged side by side in the x-axis direction. The configuration of the first wobble detection sensor 300a and the configuration of the second wobble detection sensor 300b are identical with each other. Therefore, the following description will be given by taking the first wobble detection sensor 300a as an example. Incidentally, it is permissible even if there is a difference between the first wobble detection sensor 300a and the second wobble detection sensor 300b in a configuration other than the configuration described below.

A scan object region 113a is indicated by chain lines on the test object 110 in FIG. 16. The scan object region 113a is a region scanned by the light amount sensor 155. A scan object region 111a is indicated by broken lines on the test object 110 in FIG. 16. The scan object region 111a is a region scanned by the first linear image sensor 160. A scan object region 112a is indicated by solid lines on the test object 110 in FIG. 16. The scan object region 112a is a region scanned by the second linear image sensor 170.

A scan object region 113b is indicated by chain lines on the test object 110 in FIG. 16. The scan object region 113b is a region scanned by the light amount sensor 156. A scan object region 111b is indicated by broken lines on the test object 110 in FIG. 16. The scan object region 111b is a region scanned by the first linear image sensor 165. A scan object region 112b is indicated by solid lines on the test object 110 in FIG. 16. The scan object region 112b is a region scanned by the second linear image sensor 175.

The scan object region 113a and the scan object region 113b are situated side by side in the x-axis direction. The scan object region 113b is situated in the +x-axis direction from the scan object region 113a. The scan object region 111a and the scan object region 111b are situated side by side in the x-axis direction. The scan object region 111b is situated in the +x-axis direction from the scan object region 111a. The scan object region 112a and the scan object region 112b are situated side by side in the x-axis direction. The scan object region 112b is situated in the +x-axis direction from the scan object region 112a.

Incidentally, the scan object region 113a and the scan object region 113b do not necessarily have to be arranged on the same line. It is permissible if the scan object region 113a and the scan object region 113b are usable for scanning different regions of the test object 110.

The scan object region 113a is the region scanned by the light amount sensor 155. The scan object region 111a is the region scanned by the first linear image sensor 160. The scan object region 112a is the region scanned by the second linear image sensor 170.

The scan object region 113b is the region scanned by the light amount sensor 156. The scan object region 111b is the region scanned by the first linear image sensor 165. The scan object region 112b is the region scanned by the second linear image sensor 175.

As shown in FIG. 16, the scan object region 112a is situated on the +y-axis side of the scan object region 111a. The scan object region 113a is situated on the −y-axis side of the scan object region 111a. The second linear image sensor 170 is situated on the −y-axis side (+y'-axis side) of the first linear image sensor 160.

As shown in FIG. 16, the scan object region 112b is situated on the +y-axis side of the scan object region 111b. The scan object region 113b is situated on the −y-axis side of the scan object region 111b. The second linear image sensor 175 is situated on the −y-axis side (+y'-axis side) of the first linear image sensor 165.

Image regions 142a, 142b and 142c are image regions formed on the photoreceiving surface 141. The image region 142a is an image region corresponding to the scan object region 111a. The image region 142b is an image region corresponding to the scan object region 112a. The image region 142c is an image region corresponding to the scan object region 113a.

As the test object 110 is transferred in the transfer direction DO (+y-axis direction), the image (image regions) of the test object 110 formed on the photoreceiving surface 141 moves in the image movement direction DI (−y-axis direction). On the photoreceiving surface 141, the light amount sensor 155 and the first and second linear image sensors 160 and 170 are arranged. In other words, when the test object 110 moves in the +y-axis direction, the image of the test object 110 on the photoreceiving surface 141 moves in the −y-axis direction (+y'-axis direction). When the test object 110 moves in the +y-axis direction, the image regions 142a, 142b and 142c on the photoreceiving surface 141 move in the −y-axis direction (+y'-axis direction).

The light amount sensor 155 successively detects the amount of light of the image moving in the −y-axis direction (+y'-axis direction). The light amount sensor 155 repeats the detection of the amount of light of the image at a certain cycle, for example. The light amount sensor 155 successively outputs data of the amount of light of the image. The light amount sensor 155 repeats the data output of the detected amount of light at a certain cycle, for example.

Each of the first and second linear image sensors 160 and 170 successively performs the scan of the image moving in the −y-axis direction (+y'-axis direction). The first and second linear image sensors 160 and 170 repeat the image scan at a certain cycle, for example. The first and second linear image sensors 160 and 170 successively output image data corresponding to the scanned images. The first and second linear image sensors 160 and 170 repeat the outputting of the image data at a certain cycle, for example.

As shown in FIG. 17, each of the first and second linear image sensors 160 and 170 includes a plurality of photoreceptor elements 160a, 170a. The photoreceptor elements 160a, 170a are arranged one-dimensionally in the x-axis direction. The x-axis direction is the main scanning direction of the first and second linear image sensors 160 and 170.

In FIG. 17, the photoreceptor elements 160a, 170a are arranged linearly, for example. The photoreceptor elements 160a, 170a convert one-dimensional image information corresponding to the scan object region 111a, 112a of the test object 110 into an electric signal. The photoreceptor elements 160a, 170a are photodiodes, for example. In short, the first and second linear image sensors 160 and 170 are image pickup element devices. The first and second linear image sensors 160 and 170 output the electric signals according to a time series. Namely, the first and second linear image sensors 160 and 170 output the electric signals periodically according to the passage of time.

As shown in FIG. 18, the wobble detection device 300 according to the third embodiment includes the first and second wobble detection sensors 300a and 300b, switching units 1832 and 1833, a switching control unit 1831, a storage unit 181 and a control unit 180. The wobble detection device 300 according to the third embodiment can include A/D (analog to digital) converters 1821, 1822, 1823, 1824, 1825 and 1826.

As shown in FIG. 18, the first wobble detection sensor 300a includes the light amount sensor 155 and the first and second linear image sensors 160 and 170. The second wobble detection sensor 300b includes the light amount sensor 156 and the first and second linear image sensors 165 and 175.

The storage unit 181 includes a memory #1 (first memory 1811), a memory #2 (second memory 1812) and a buffer memory 1813, for example. The storage unit 181 includes a first storage unit and a second storage unit, for example. The first storage unit includes the memory #1 (first memory 1811) and the memory #2 (second memory 1812), for example. The second storage unit includes the buffer memory 1813, for example. Incidentally, the buffer memory 1813 can be left out in cases where signals from the switching unit 1833 are directly sent to the control unit 180 and processed.

In the following description, the memory 1811 will be referred to as the memory #1. Similarly, the memory 1812 will be referred to as the memory #2. In the memory #1 and the memory #2, the reference image data is stored. The reference image data is the first image data. In the buffer memory 1813, the comparative image data is stored. The comparative image data is the second image data.

Light amount information obtained by the detection by the light amount sensor 155, 156 (data $S_{33}$, data $S_{43}$) is outputted respectively to the A/D converter 1821, 1824. The outputted light amount information (data $S_{33}$, data $S_{43}$) is converted by the A/D converter 1821, 1824 into a digital signal. The light amount information converted into the digital signal (data $S_{36}$, data $S_{46}$) is sent to the switching control unit 1831.

The switching control unit 1831 compares the output of the light amount sensor 155 (data $S_{33}$) with the output of the light amount sensor 156 (data $S_{43}$). In FIG. 18, the switching control unit 1831 makes a comparison between the light amount information converted into the digital signal (data $S_{36}$ and data $S_{46}$).

When the output of the light amount sensor 155 (data $S_{33}$) is higher, the switching control unit 1831 makes the switching unit 1832 select the light amount information from the first linear image sensor 160 (data $S_{31}$). Further, the switching control unit 1831 makes the switching unit 1833 select the light amount information from the second linear image sensor 170 (data $S_{32}$). The output of the light amount sensor 155 is a first light amount.

In FIG. 18, the light amount information from the first linear image sensor 160 (data $S_{31}$) is the output signal of the A/D converter 1822 (data $S_{34}$). In FIG. 18, the light amount information from the second linear image sensor 170 (data $S_{32}$) is the output signal of the A/D converter 1823 (data $S_{35}$).

When the output of the light amount sensor 156 (data $S_{43}$) is higher, the switching control unit 1831 makes the switching unit 1832 select the light amount information from the first linear image sensor 165 (data $S_{41}$). Further, the switching control unit 1831 makes the switching unit 1833 select the light amount information from the second linear image sensor 175 (data $S_{42}$). The output of the light amount sensor 156 is a second light amount.

In FIG. 18, the light amount information from the first linear image sensor 165 (data $S_{41}$) is the output signal of the A/D converter 1825 (data $S_{44}$). In FIG. 18, the light amount information from the second linear image sensor 175 (data $S_{42}$) is the output signal of the A/D converter 1826 (data $S_{45}$).

The test object 110 is transferred in the transfer direction DO by the transfer apparatus 150, for example. In this case, the image (image regions 142a, 142b and 142c) of the test object 110 formed on the photoreceiving surface 141 moves in the image movement direction DI (+y'-axis direction).

As shown in FIG. 17, the dimension of each of the linear image sensors 160, 170 in the y-axis direction is the length Wy. The dimension of each of the linear image sensors 160, 170 in the x-axis direction is the length Wx. The dimension of the light amount sensor 155 in the y-axis direction is the length Iy. The dimension of the light amount sensor 155 in the x-axis direction is the length Wx. The distance from the linear image sensor 160 to the light amount sensor 155 in the y-axis direction is the length Iy.

The time necessary for the image regions 142a, 142b and 142c to advance the distance Wy is assumed to be ΔT. In this case, the transfer speed of the test object 110 in the transfer direction DO is Wy/ΔT. Due to the transfer of the test object 110 in the transfer direction DO, the image regions 142a, 142b and 142c on the photoreceiving surface 141 move in the image movement direction DI.

The length of each of the light amount sensors 155, 156 in the y-axis direction is the length Iy, for example. Thus, the time necessary for the moving image region 142c to pass through the light amount sensor 155, 156 is (Iy/Wy)×ΔT.

The light amount sensor 155 is disposed at a position the length Iy apart from the end of the first linear image sensor 160 in the +y-axis direction, for example. Thus, the time necessary for the image region 142c situated on the light amount sensor 155 to reach the first linear image sensor 160 is (Iy/Wy)×ΔT.

The switching control unit 1831 reads out the output signals of the light amount sensors 155 and 156 in a cycle whose period is equal to the time (Iy/Wy)×ΔT. Then, the switching control unit 1831 holds the output signals of the light amount sensors 155 and 156. The switching control unit 1831 compares the output signal of the light amount sensor 155 held therein with the output signal of the light amount sensor 156 held therein. The output signals of the light amount sensors 155 and 156 compared with each other are signals that were held the time (Iy/Wy)×ΔT earlier.

The switching control unit 1831 compares the output signals of the light amount sensors 155 and 156 in a cycle whose period is equal to the time (Iy/Wy)×ΔT. The switching control unit 1831 makes the switching units 1832 and 1833 switch between the signals from the first and second linear image sensors 160 and 170 and the signals from the first and second linear image sensors 165 and 175.

The following explanation will be given of a case where the output of the light amount sensor 155 is higher than the output of the light amount sensor 156, for example.

The information regarding the images of the scan object regions 111 and 113 of the test object 110 scanned by the first and second linear image sensors 160 and 170 is image data (data $S_{31}$, data $S_{32}$) as analog signals. The image data (data $S_{31}$, data $S_{32}$) as analog signals are respectively sent to the A/D converters 1822 and 1823.

The first linear image sensor 160 sends the data $S_{32}$ to the A/D converter 1822. The data $S_{32}$ is the image data obtained by the scan by the first linear image sensor 160. The data $S_{32}$ is an analog signal.

The second linear image sensor 170 sends the data $S_{32}$ to the A/D converter 1823. The data $S_{32}$ is the image data obtained by the scan by the second linear image sensor 170. The data $S_{32}$ is an analog signal.

The image data (data $S_{31}$, data $S_{32}$) outputted from the first and second linear image sensors 160 and 170 are converted by the A/D converters 1822 and 1823 into digital signals. The image data converted into the digital signals (data $S_{34}$, data $S_{35}$) pass through the switching units 1832 and 1833 and are respectively stored in one of the memory #1, the memory #2 and the buffer memory 1813 of the storage unit 181.

The A/D converter 1822 outputs the data $S_{34}$. The A/D converter 1823 outputs the data $S_{35}$. The data $S_{34}$ and $S_{35}$ are digital signals. The data $S_{34}$ is sent to the memory #1 or the memory #2. The data $S_{35}$ is sent to the buffer memory 1813. The memory #1 or the memory #2 stores the received data $S_{34}$. The buffer memory 1813 stores the received data $S_{35}$.

The image scan by the first and second linear image sensors 160 and 170 is performed repeatedly at a certain cycle, for example. The outputting of the image data by the first and second linear image sensors 160 and 170 is performed repeatedly at a certain cycle, for example. Therefore, image data of the test object 110 are stored in the storage unit 181 according to a time series. Namely, image data of the test object 110 are stored in the storage unit 181 in the order of the time of reception.

The first and second linear image sensors 160 and 170 perform the image scan periodically. The first and second linear image sensors 160 and 170 output the data $S_{31}$ and $S_{32}$ periodically. Similarly, the A/D converters 182 and 183 output the data $S_{34}$ and $S_{35}$ periodically. The storage unit 181 stores the data $S_{34}$ and $S_{35}$ corresponding to the times when the data $S_{34}$ and $S_{35}$ were received.

The foregoing explanation of FIG. 4 and FIG. 13 is substituted for the explanation of the processing after the storage unit 181.

(3-2) Effect

As described above, the wobble detection device 300 according to the third embodiment is capable of selecting the output signals of the first wobble detection sensor 300a or the output signals of the second wobble detection sensor 300b based on the output signals of the light amount sensors 155 and 156 (data $S_{33}$, data $S_{43}$).

In cases where the test object 110 is in a dark environment, for example, the wobble detection device 300 is capable of selecting the output signals of one of the two wobble detection sensors from which signals of bright images can be obtained. In the third embodiment, the two wobble detection sensors are the first wobble detection sensor 300a and the second wobble detection sensor 300b.

Specifically, when the photoreception sensitivity of the first and second linear image sensors 160 and 170 of the first wobble detection sensor 300a is higher than the photoreception sensitivity of the first and second linear image sensors 165 and 175 of the second wobble detection sensor 300b, for example, the output signals of the first wobble detection sensor 300a are selected.

In cases where the test object 110 is in a bright environment, for example, the wobble detection device 300 is capable of selecting the output signals of one of the two wobble detection sensors from which signals of unsaturated images can be obtained, for example. In other words, the wobble detection device 300 is capable of selecting a wobble detection sensor of the lower photoreception sensitivity.

Specifically, when the photoreception sensitivity of the first and second linear image sensors 160 and 170 of the first wobble detection sensor 300a is lower than the photoreception sensitivity of the first and second linear image sensors 165 and 175 of the second wobble detection sensor 300b, for example, the output signals of the first wobble detection sensor 300a are selected.

When the output signals of the first wobble detection sensor 300a are selected, the wobble detection device 300 performs the correlation calculation in regard to the reference image data outputted from the first linear image sensor 160 and the comparative image data outputted from the second linear image sensor 170.

When the output signals of the second wobble detection sensor 300b are selected, the wobble detection device 300 performs the correlation calculation in regard to the reference image data outputted from the first linear image sensor 165 and the comparative image data outputted from the second linear image sensor 175.

With this configuration, the wobble detection device 300 according to the third embodiment can select bright images of the imaging object, for example. Alternatively, the wobble detection device 300 according to the third embodiment can select unsaturated images of the imaging object, for example.

By selecting bright images of the imaging object, the wobble detection device 300 according to the third embodiment can set the sensor gain of the first and second wobble detection sensors 300a and 300b at a low level. Accordingly, the wobble detection device 300 can detect the wobble amount of the test object 110 by using low noise images.

Further, the calculation of the wobble amount can be performed repeatedly at a certain cycle. The detection of the amount of light can be performed repeatedly at a certain cycle. Thus, even in cases where a plurality of test objects 110 are transferred successively, for example, the detection accuracy of the wobble amounts of the test objects 110 with respect to the image pickup equipment can be increased.

Incidentally, it is also possible to provide a storage unit 181 corresponding to each of the wobble detection sensors 300a and 300b without employing the switching units 1832 and 1833. Data stored in one of the storage units 181 may be selected based on the amounts of light detected by the light amount sensors 155 and 156.

The wobble detection device 300 includes a memory #1 and a memory #2 for storing reference image data as the image data $S_{31}$ that is outputted when a scan object region of the object 110 is scanned by the first linear image sensor 160. The wobble detection device 300 includes a first buffer memory for storing comparative image data as the image data $S_{32}$ that is outputted when a scan object region of the object 110 is scanned by the second linear image sensor 170. A first storage unit includes the memory #1, the memory #2 and the first buffer memory.

The wobble detection device 300 includes a memory #3 and a memory #4 for storing reference image data as the image data $S_{41}$ that is outputted when a scan object region of the object 110 is scanned by the first linear image sensor 165. The wobble detection device 300 includes a second buffer memory for storing comparative image data as the image data $S_{42}$ that is outputted when a scan object region of the object 110 is scanned by the second linear image sensor 175. A second storage unit includes the memory #3, the memory #4 and the second buffer memory.

The control unit 180 selects the first storage unit or the second storage unit based on the amounts of light detected by the light amount sensors 155 and 156.

(4) Fourth Embodiment

In a fourth embodiment, examples of use of the above-described wobble detection devices 100, 200 and 300 will be described. In the following usage examples, examples of using the wobble detection device 200 according to the second embodiment will be described as specific examples. Thus, it is also possible to use the wobble detection device 100 according to the first embodiment or the wobble detection device 300 according to the third embodiment in the following usage examples.

The wobble detection device 200 includes the line scan camera 240. The wobble detection device 200 can include the imaging lens 230. The imaging lens 230 is an imaging optical system that forms an image of the test object 110. In the following usage examples, the test object 110 is a train 310 (first usage example), rails 410 (second usage example), or the ground 510 (third usage example).

The line scan camera 240 is the same as the line scan camera 240 in the second embodiment, for example. The first image pickup unit includes the first linear image sensor 260 and the third linear image sensor 265. The second image pickup unit includes the second linear image sensor 270 and the third linear image sensor 265.

First Usage Example

Figure 19:
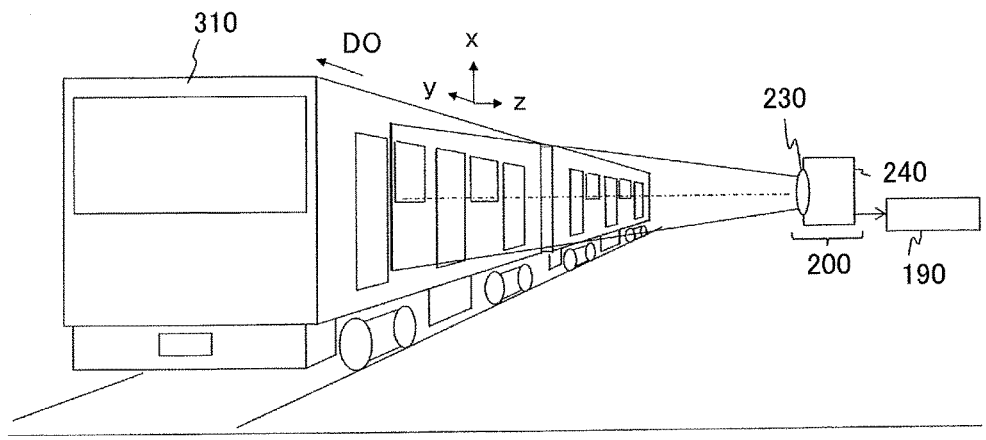
FIG. 19 is a diagram schematically showing a configuration of a wobble detection device according to a first usage example of a fourth embodiment of the present invention.

FIG. 19 is a diagram schematically showing a configuration of a wobble detection device 200 according to a first usage example of the fourth embodiment of the present invention.

As shown in FIG. 19, the line scan camera 240 of the wobble detection device 200 is capturing images of a train 310. In FIG. 19, the line scan camera 240 is capturing images of a side surface of the train 310.

A moving direction DO of the train 310 is assumed to be the +y-axis direction (auxiliary scanning direction). The main scanning direction of the wobble detection device 200 is assumed to be the x-axis direction. The +x-axis direction is the upward direction of the train 310. The −x-axis direction is the downward direction of the train 310. A direction orthogonal to both the x-axis direction and the y-axis direction is defined as the z-axis direction. The +z-axis direction is the direction heading from the train 310 towards the wobble detection device 200.

A relative moving speed in the moving direction DO is desired to be a predetermined speed. Thus, the relative speed of the train 310 in the y-axis direction as viewed from the wobble detection device 200 is desired to be a constant speed.

The wobble detection device 200 according to the first usage example of the fourth embodiment is equipped with the line scan camera 240, and therefore images of the whole of the traveling train 310 can be captured. Specifically, images of the whole of the train 310 can be captured even when the train 310 includes a plurality of cars. At the time of image capture, the wobble in the x-axis direction can be compensated for by the wobble detection device 200. Incidentally, it is possible to move the wobble detection device 200 with respect to a stopped train 310 and thereby capture images of the whole of the train 310.

As described above, with the wobble detection device 200 according to the first usage example of the fourth embodiment, the wobble in the x-axis direction as the vertical direction of the train 310 can be compensated for at the time of capturing images of the traveling train 310.

Second Usage Example

Figure 20:
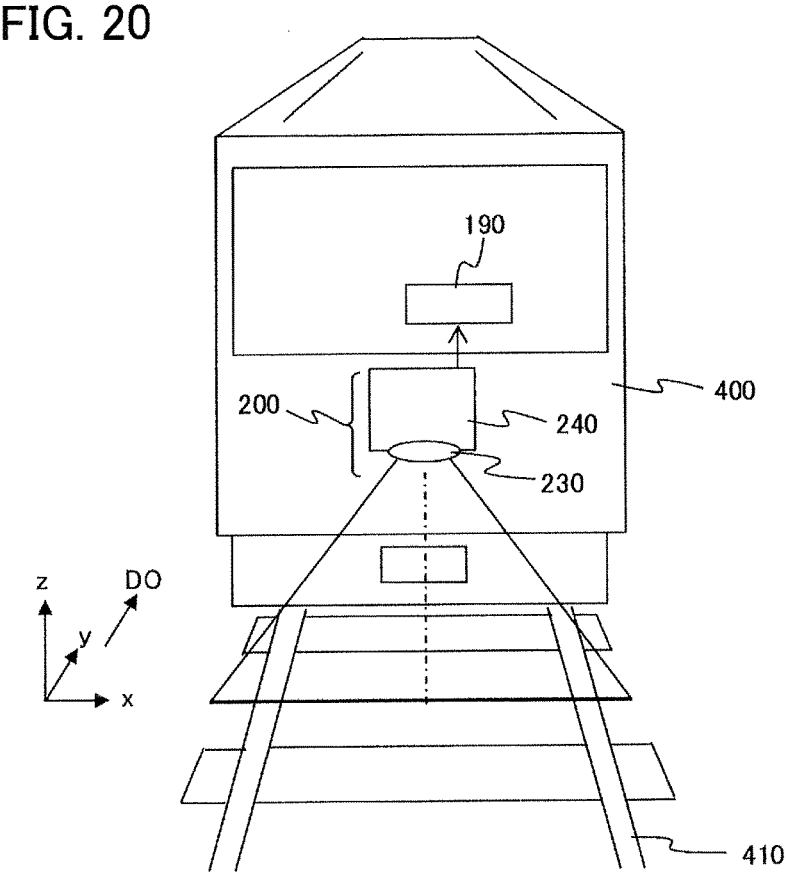
FIG. 20 is a diagram schematically showing a configuration of a wobble detection device according to a second usage example of the fourth embodiment.

FIG. 20 is a diagram schematically showing a configuration of a wobble detection device 200 according to a second usage example of the fourth embodiment.

As shown in FIG. 20, the wobble detection device 200 is attached to a train 400. The line scan camera 240 of the wobble detection device 200 is capturing images of rails 410.

A relative moving direction DO of the rails 410 with respect to the train 400 is assumed to be the +y-axis direction (auxiliary scanning direction). Namely, the moving direction of the train 400 is the −y-axis direction. Thus, the line scan camera 240 of the wobble detection device 200 attached to the train 400 is capturing images of the rails 410 in front of the train 400. Incidentally, it is also possible to attach the wobble detection device 200 to the back of the train 400 and make the line scan camera 240 of the wobble detection device 200 capture images of rails to the rear of the train 400.

The main scanning direction of the wobble detection device 200 is assumed to be the x-axis direction. The +x-axis direction corresponds to the left-hand side with respect to the traveling direction of the train 400. The −x-axis direction corresponds to the right-hand side with respect to the traveling direction of the train 400. A direction orthogonal to both the x-axis direction and the y-axis direction is defined as the z-axis direction. The +z-axis direction is the upward direction of the train 400.

A relative moving speed in the moving direction DO is desired to be a predetermined speed. The relative speed between the wobble detection device 200 in the train 400 and the rails 410 in the y-axis direction is desired to be a constant speed. However, the expansion/contraction of images can be corrected by selecting images in the auxiliary scanning direction depending on the speed of the train 400.

The wobble detection device 200 according to the second usage example of the fourth embodiment is equipped with the line scan camera 240, and therefore images of the rails 410 can be captured from the traveling train 400. Specifically, images of the rails 410 in the whole range through which the train 400 travels can be captured. At the time of image capture, the wobble in the x-axis direction can be compensated for by the wobble detection device 200. Accordingly, it is possible to check the condition of the rails 410 from the traveling train 400.

As described above, with the wobble detection device 200 according to the second usage example of the fourth embodiment, the wobble in the x-axis direction as the short-side direction of the rails 410 can be compensated for at the time of capturing images of the rails 410 from the traveling train 400.

Third Usage Example

Figure 21:
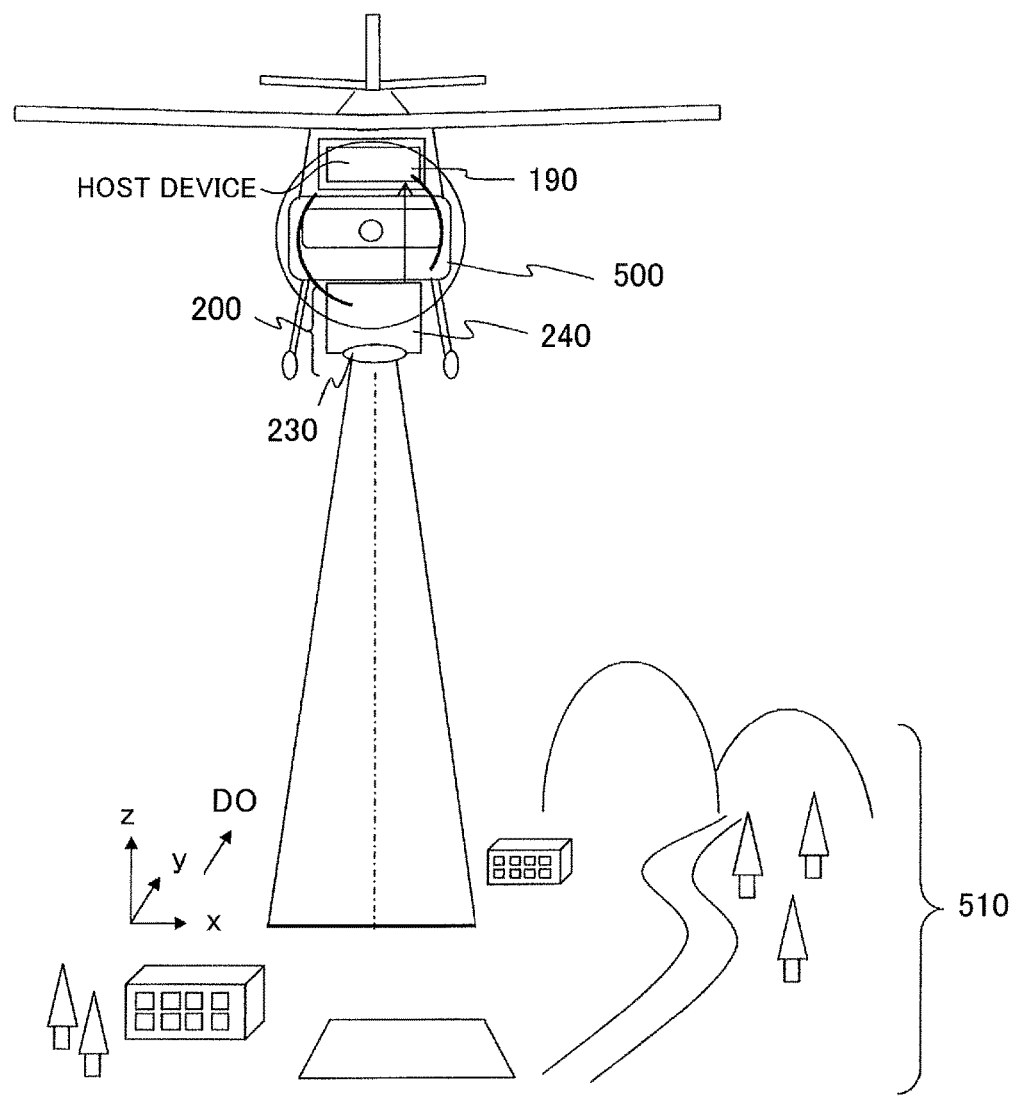
FIG. 21 is a diagram schematically showing a configuration of a wobble detection device according to a third usage example of the fourth embodiment.

FIG. 21 is a diagram schematically showing a configuration of a wobble detection device 200 according to a third usage example of the fourth embodiment.

As shown in FIG. 21, the wobble detection device 200 according to the third usage example of the fourth embodiment is attached to an airplane 500. The line scan camera 240 of the wobble detection device 200 is capturing images of the ground 510.

A relative moving direction DO of the ground 510 with respect to the airplane 500 is assumed to be the +y-axis direction (auxiliary scanning direction). Namely, the moving direction of the airplane 500 is the −y-axis direction. The main scanning direction of the wobble detection device 200 is assumed to be the x-axis direction. The +x-axis direction corresponds to the left-hand side with respect to the traveling direction of the airplane 500. The −x-axis direction corresponds to the right-hand side with respect to the traveling direction of the airplane 500. A direction orthogonal to both the x-axis direction and the y-axis direction is defined as the z-axis direction. The +z-axis direction is the upward direction from the ground 510.

A relative moving speed in the moving direction DO is desired to be a predetermined speed. Thus, the relative speed of the airplane 500 in the y-axis direction as viewed from the wobble detection device 200 is desired to be a constant speed. However, the expansion/contraction of images can be corrected by selecting images in the auxiliary scanning direction depending on the speed of the airplane 500.

The wobble detection device 200 according to the fourth embodiment is equipped with the line scan camera 240, and therefore images of the ground 510 can be captured continuously from the flying airplane 500. Specifically, images of the ground 510 in the whole range over which the airplane 500 flies can be captured. At the time of image capture, the wobble in the x-axis direction can be compensated for by the wobble detection device 200. Accordingly, images of the ground 510 can be captured from the flying airplane 500 by using an image capturing device reduced in weight.

As described above, with the wobble detection device 200 according to the third usage example of the fourth embodiment, the wobble in the x-axis direction can be compensated for at the time of capturing images of the ground 510 from the airplane 500.

Incidentally, terms indicating a positional relationship between components or the shape of a component, such as "parallel" and "orthogonal", may have been used in the above embodiments. These terms are intended to include a range allowing for tolerances in the manufacture, variations in the assembly, or the like. Therefore, when a description indicating the positional relationship between components or the shape of a component is included in the claims, such a description is intended to include a range allowing for tolerances in the manufacture, variations in the assembly, or the like.

Further, while embodiments of the present invention have been described as above, the present invention is not limited to these embodiments.

Based on the above embodiments, the contents of the present invention will be described below as appendix-(1) to appendix-(3). Reference characters are assigned to the appendix-(1) and the appendix-(2) independently of each other. Thus, "appendix 1" exists in each of the appendix-(1) and the appendix-(2), for example.

Incidentally, a feature of a device in the appendix-(1) may be provided in a device in the appendix-(2) and a device in the appendix-(3). Further, a feature of a device in the appendix-(2) may be provided in a device in the appendix-(3). It is also possible to combine a feature of a device in the appendix-(1), a feature of a device in the appendix-(2) and a feature of a device in the appendix-(3).

APPENDIX-(1)

Appendix 1

A wobble detection device for detecting a wobble amount of a position of an object being transferred in a first direction in regard to a second direction different from the first direction, comprising:
a first image pickup unit that includes a plurality of first photoreceptor elements arranged in the second direction and successively outputs first image data;
a second image pickup unit that includes a plurality of second photoreceptor elements arranged in the second direction and successively outputs second image data;
a first storage unit to temporarily store reference image data as the first image data outputted when a scan object region of the object is scanned by the first image pickup unit;
a second storage unit to temporarily store comparative image data as the second image data outputted when the scan object region is scanned by the second image pickup unit; and
a control unit that detects the wobble amount based on the reference image data stored in the first storage unit and the comparative image data stored in the second storage unit.

Appendix 2

The wobble detection device according to appendix 1, wherein the first image pickup unit and the second image pickup unit are disposed at positions different from each other in the first direction.

Appendix 3

The wobble detection device according to appendix 1 or 2, wherein the second direction is orthogonal to the first direction.

Appendix 4

The wobble detection device according to any one of appendixes 1 to 3, wherein the control unit detects the wobble amount based on a calculation result obtained by performing correlation calculation between the reference image data and the comparative image data.

Appendix 5

The wobble detection device according to appendix 4, wherein the correlation calculation includes calculation for obtaining a sum total of differences between the reference image data and the comparative image data as the calculation result.

Appendix 6

The wobble detection device according to any one of appendixes 1 to 3, wherein the control unit detects the wobble amount based on a first calculation result obtained by performing correlation calculation between the reference image data and the comparative image data and at least one second calculation result obtained by performing correlation calculation between the reference image data and at least a piece of new comparative image data obtained by shifting the comparative image data in the second direction.

Appendix 7

The wobble detection device according to appendix 6, wherein the correlation calculation includes calculation for obtaining the sum total of the differences between the reference image data and the comparative image data as the first calculation result and calculation for obtaining a sum total of differences between the reference image data and the new comparative image data as the second calculation result.

Appendix 8

The wobble detection device according to any one of appendixes 4 to 7, wherein
the first image pickup unit outputs the first image data at a certain cycle,
the second image pickup unit outputs the second image data at the certain cycle, and
the control unit performs the correlation calculation successively.

Appendix 9

The wobble detection device according to appendix 8, wherein
a length of a first photoreceiving region, as a photoreceiving region of a photoreceiving surface of the plurality of first photoreceptor elements, in the first direction is equal to a distance for which the object is transferred at the certain cycle, and
a length of a second photoreceiving region, as a photoreceiving region of a photoreceiving surface of the plurality of second photoreceptor elements, in the first direction is equal to the distance for which the object is transferred at the certain cycle.

Appendix 10

The wobble detection device according to any one of appendixes 1 to 9, wherein
the first storage unit includes a first memory and a second memory, and
the second storage unit includes a buffer memory.

Appendix 11

The wobble detection device according to any one of appendixes 1 to 10, wherein
the first image pickup unit includes a first linear image sensor that includes the plurality of first photoreceptor elements, and
the second image pickup unit includes a second linear image sensor that includes the plurality of second photoreceptor elements.

Appendix 12

The wobble detection device according to any one of appendixes 1 to 10, comprising:
a first linear image sensor including the plurality of first photoreceptor elements;
a second linear image sensor including the plurality of second photoreceptor elements; and
a third linear image sensor disposed between the first linear image sensor and the second linear image sensor and including a plurality of third photoreceptor elements arranged in the second direction, wherein
the first image pickup unit includes the first linear image sensor and the third linear image sensor, and the second image pickup unit includes the second linear image sensor and the third linear image sensor.

Appendix 13

The wobble detection device according to appendix 12, wherein
a length of a first photoreceiving region, as a photoreceiving region of a photoreceiving surface of the plurality of first photoreceptor elements, in the first direction is equal to a length of a second photoreceiving region, as a photoreceiving region of a photoreceiving surface of the plurality of second photoreceptor elements, in the first direction, and
a length of a third photoreceiving region, as a photoreceiving region of a photoreceiving surface of the plurality of third photoreceptor elements, in the first direction is longer than the length of the first photoreceiving region, as the photoreceiving region of the photoreceiving surface of the plurality of first photoreceptor elements, in the first direction.

APPENDIX-(2)

Appendix 1

A wobble detection device comprising:
a sensor unit that includes a first one-dimensional image sensor and a second one-dimensional image sensor arranged side by side in an auxiliary scanning direction so that corresponding pixels of the first one-dimensional image sensor and a second one-dimensional image sensor coincide with each other in a main scanning direction and acquires an image of an object moving in the auxiliary scanning direction as one-dimensional data,
the wobble detection device making a comparison of data corresponding to the same image region of the image by using first one-dimensional data acquired by the first one-dimensional image sensor and second one-dimensional data acquired by the second one-dimensional image sensor and thereby detecting a movement amount of the image in the main scanning direction between a time when the first one-dimensional data used for the comparison was acquired and a time when the second one-dimensional data used for the comparison was acquired.

Appendix 2

The wobble detection device according to appendix 1, wherein an arrangement direction of pixels of the first one-dimensional image sensor and an arrangement direction of pixels of the second one-dimensional image sensor are parallel to each other.

Appendix 3

The wobble detection device according to appendix 1 or 2, wherein an arrangement direction of the pixels of the first one-dimensional image sensor and an arrangement direction of the pixels of the second one-dimensional image sensor are parallel to the main scanning direction.

Appendix 4

The wobble detection device according to any one of appendixes 1 to 3, wherein
the pixels of the first one-dimensional image sensor correspond to first photoreceptor elements, and
the pixels of the second one-dimensional image sensor correspond to second photoreceptor elements.

Appendix 5

The wobble detection device according to any one of appendixes 1 to 4, wherein a length of the pixels of the first one-dimensional image sensor in the auxiliary scanning direction is equal to a length of the pixels of the second one-dimensional image sensor in the auxiliary scanning direction.

Appendix 6

The wobble detection device according to appendix 5, wherein scanning of the image is performed at intervals, each interval being equal to a time in which the image moves the length in the auxiliary scanning direction.

Appendix 7

The wobble detection device according to any one of appendixes 1 to 6, wherein scanning of the image by the first one-dimensional image sensor and scanning of the image by the second one-dimensional image sensor are performed in sync with each other.

Appendix 8

The wobble detection device according to any one of appendixes 1 to 7, wherein correlation between the first one-dimensional data and the second one-dimensional data corresponding to the same image region is obtained.

Appendix 9

The wobble detection device according to any one of appendixes 1 to 7, comprising:
a first memory to store the first one-dimensional data;
a second memory to store first one-dimensional data of an image region differing in the auxiliary scanning direction from the image region of the first one-dimensional data stored in the first memory; and
a third memory to store the second one-dimensional data.

Appendix 10

The wobble detection device according to appendix 9, wherein the first memory and the second memory alternately store the first one-dimensional data acquired successively.

Appendix 11

The wobble detection device according to appendix 9 or 10, wherein correlation between data in the first memory and data in the third memory corresponding to the same image region or correlation between data in the second memory and data in the third memory corresponding to the same image region is obtained.

Appendix 12

The wobble detection device according to any one of appendixes 1 to 11, wherein the first one-dimensional data and the second one-dimensional data are acquired in sync with each other.

Appendix 13

The wobble detection device according to any one of appendixes 1 to 12, wherein the first one-dimensional data and the second one-dimensional data are acquired at a same cycle.

Appendix 14

The wobble detection device according to any one of appendixes 1 to 6, wherein
the sensor unit includes a third one-dimensional image sensor,
the third one-dimensional image sensor is disposed between the first one-dimensional image sensor and the second one-dimensional image sensor so that the one-dimensional image sensors are arranged in the auxiliary scanning direction and corresponding pixels of the one-dimensional image sensors coincide with each other in the main scanning direction, and acquires an image moving in the auxiliary scanning direction as third one-dimensional data,
fourth one-dimensional data is generated from the first one-dimensional data from the first one-dimensional image sensor and the third one-dimensional data from the third one-dimensional image sensor,
fifth one-dimensional data is generated from the second one-dimensional data from the second one-dimensional image sensor and the third one-dimensional data from the third one-dimensional image sensor, and
the comparison is made by using the fourth one-dimensional data and the fifth one-dimensional data corresponding to the same image region.

Appendix 15

The wobble detection device according to appendix 14, wherein an arrangement direction of the pixels of the first one-dimensional image sensor, an arrangement direction of the pixels of the second one-dimensional image sensor, and an arrangement direction of pixels of the third one-dimensional image sensor are parallel to each other.

Appendix 16

The wobble detection device according to appendix 14 or 15, wherein an arrangement direction of the pixels of the first one-dimensional image sensor, an arrangement direction of the pixels of the second one-dimensional image sensor, and an arrangement direction of the pixels of the third one-dimensional image sensor are parallel to the main scanning direction.

Appendix 17

The wobble detection device according to any one of appendixes 14 to 16, wherein the pixels of the third one-dimensional image sensor correspond to third photoreceptor elements.

Appendix 18

The wobble detection device according to any one of appendixes 14 to 17, wherein an amount of light received by the third one-dimensional image sensor is larger than an amount of light received by the first one-dimensional image sensor and larger than an amount of light received by the second one-dimensional image sensor.

Appendix 19

The wobble detection device according to any one of appendixes 14 to 18, wherein an amount of light received by the first one-dimensional image sensor is equal to an amount of light received by the second one-dimensional image sensor.

Appendix 20

The wobble detection device according to any one of appendixes 14 to 19, wherein photoreception sensitivity of the third one-dimensional image sensor is higher than photoreception sensitivity of the first one-dimensional image sensor and higher than photoreception sensitivity of the second one-dimensional image sensor.

Appendix 21

The wobble detection device according to any one of appendixes 14 to 20, wherein photoreception sensitivity of the first one-dimensional image sensor is equal to photoreception sensitivity of the second one-dimensional image sensor.

Appendix 22

The wobble detection device according to any one of appendixes 14 to 21, wherein a photoreceiving area of the third one-dimensional image sensor is larger than a photoreceiving area of the first one-dimensional image sensor and larger than a photoreceiving area of the second one-dimensional image sensor.

Appendix 23

The wobble detection device according to any one of appendixes 14 to 22, wherein a photoreceiving area of the first one-dimensional image sensor is equal to a photoreceiving area of the second one-dimensional image sensor.

Appendix 24

The wobble detection device according to any one of appendixes 14 to 23, wherein
fourth one-dimensional data is obtained from corresponding pixel data of the first one-dimensional data from the first one-dimensional image sensor and the third one-dimensional data from the third one-dimensional image sensor, and
fifth one-dimensional data is obtained from corresponding pixel data of the second one-dimensional data from the second one-dimensional image sensor and the third one-dimensional data from the third one-dimensional image sensor.

Appendix 25

The wobble detection device according to appendix 24, wherein correlation between the fourth one-dimensional data and the fifth one-dimensional data corresponding to the same image region is obtained.

Appendix 26

The wobble detection device according to any one of appendixes 14 to 23, comprising:
a first adder that adds together corresponding pixel data of the first one-dimensional data from the first one-dimensional image sensor and the third one-dimensional data from the third one-dimensional image sensor; and
a second adder that adds together corresponding pixel data of the second one-dimensional data from the second one-dimensional image sensor and the third one-dimensional data from the third one-dimensional image sensor.

Appendix 27

The wobble detection device according to appendix 26, comprising:
a first memory to store the fourth one-dimensional data from the first adder;
a second memory to store fourth one-dimensional data of an image region differing in the auxiliary scanning direction from the image region of the fourth one-dimensional data stored in the first memory; and
a third memory to store the fifth one-dimensional data from the second adder.

Appendix 28

The wobble detection device according to appendix 27, wherein correlation between data in the first memory and data in the third memory corresponding to the same image region or correlation between data in the second memory and data in the third memory corresponding to the same image region is obtained.

Appendix 29

The wobble detection device according to appendix 27 or 28, wherein the first memory and the second memory alternately store the fourth one-dimensional data acquired successively.

Appendix 30

The wobble detection device according to any one of appendixes 14 to 29, wherein the first one-dimensional data, the second one-dimensional data and the third one-dimensional data are acquired in sync with each other.

Appendix 31

The wobble detection device according to any one of appendixes 14 to 30, wherein the first one-dimensional data, the second one-dimensional data and the third one-dimensional data are acquired at a same cycle.

Appendix 32

The wobble detection device according to any one of appendixes 1 to 31, wherein
the sensor unit includes a light amount sensor,
a plurality of the sensor units are provided, and
the sensor unit for detecting the movement amount is selected based on light amount values of the light amount sensors.

Appendix 33

The wobble detection device according to appendix 32, wherein the plurality of sensor units scan the image regions different from each other.

Appendix 34

The wobble detection device according to appendix 33, wherein the different image regions differ from each other in the main scanning direction.

Appendix 35

The wobble detection device according to any one of appendixes 32 to 34, wherein the plurality of sensor units are arranged side by side in the main scanning direction.

APPENDIX-(3)

Appendix 1

A wobble detection device for detecting a wobble amount of an object moving relatively, comprising:
a first image pickup unit that includes a plurality of first photoreceptor elements arranged in a second direction different from a first direction corresponding to a moving direction of an image of the object on a photoreceiving surface and acquires data of a first image of the object;
a second image pickup unit that includes a plurality of second photoreceptor elements arranged in the second direction and acquires data of a second image of the object;
a first storage unit to store the data of the first image as reference image data;
a second storage unit to store the data of the second image as comparative image data; and
a control unit that detects the wobble amount based on the reference image data stored in the first storage unit and the comparative image data stored in the second storage unit.

Appendix 2

The wobble detection device according to appendix 1, wherein the first image pickup unit and the second image pickup unit are disposed at positions different from each other in the first direction.

Appendix 3

The wobble detection device according to appendix 1 or 2, wherein the second direction is orthogonal to the first direction.

Appendix 4

The wobble detection device according to any one of appendixes 1 to 3, wherein the control unit detects the wobble amount by performing correlation calculation between the reference image data and the comparative image data.

Appendix 5

The wobble detection device according to appendix 4, wherein the correlation calculation includes calculation for obtaining a sum total of differences between values of corresponding pixels of the reference image data and the comparative image data.

Appendix 6

The wobble detection device according to appendix 5, wherein the correlation calculation is performed while changing corresponding pixels of the reference image data and the comparative image data by moving the corresponding pixels in an arrangement direction of the pixels.

Appendix 7

The wobble detection device according to appendix 5, wherein the control unit detects the wobble amount by using a first calculation result obtained by performing correlation calculation between the reference image data and the comparative image data, and by performing correlation calculation between the reference image data and at least a piece of new comparative image data obtained by shifting the comparative image data in an arrangement direction of the pixels.

Appendix 8

The wobble detection device according to any one of appendixes 5 to 7, wherein the correlation calculation includes calculation for obtaining the sum total of the differences between the values of the corresponding pixels of the reference image data and the comparative image data and calculation for obtaining a sum total of differences between values of corresponding pixels of the reference image data and the new comparative image data.

Appendix 9

The wobble detection device according to any one of appendixes 4 to 8, wherein
the first image pickup unit outputs the data of the first image at a certain cycle,
the second image pickup unit outputs the data of the second image at the certain cycle, and
the control unit performs the correlation calculation successively.

Appendix 10

The wobble detection device according to any one of appendixes 1 to 9, wherein
a length of a first photoreceiving region, as a photoreceiving region on a photoreceiving surface formed by the plurality of first photoreceptor elements, in the first direction is equal to a distance of movement of the image of the object in the first direction on the photoreceiving surface at the certain cycle, and
a length of a second photoreceiving region, as a photoreceiving region on a photoreceiving surface formed by the plurality of second photoreceptor elements, in the first direction is equal to a distance of movement of the image of the object in the first direction on the photoreceiving surface at the certain cycle.

Appendix 11

The wobble detection device according to any one of appendixes 1 to 10, wherein
the first storage unit includes a first memory and a second memory, and
the second storage unit includes a buffer memory.

Appendix 12

The wobble detection device according to any one of appendixes 1 to 11, wherein
the first image pickup unit includes a first linear image sensor that includes the plurality of first photoreceptor elements, and
the second image pickup unit includes a second linear image sensor that includes the plurality of second photoreceptor elements.

Appendix 13

The wobble detection device according to appendix 12, comprising a third linear image sensor disposed between the first linear image sensor and the second linear image sensor and including a plurality of third photoreceptor elements arranged in the second direction, wherein
the first image pickup unit includes the third linear image sensor, and
the second image pickup unit includes the third linear image sensor.

Appendix 14

The wobble detection device according to appendix 13, wherein
the data of the first image is obtained by adding output values of the first photoreceptor elements and output values of the third photoreceptor elements corresponding to each other, and
the data of the second image is obtained by adding output values of the second photoreceptor elements and output values of the third photoreceptor elements corresponding to each other.

Appendix 15

The wobble detection device according to appendix 13 or 14, wherein a length of a first photoreceiving region, as a photoreceiving region on a photoreceiving surface formed by the plurality of first photoreceptor elements, in the first direction is equal to a length of a second photoreceiving region, as a photoreceiving region on a photoreceiving surface formed by the plurality of second photoreceptor elements, in the first direction, and is shorter than a length of a third photoreceiving region, as a photoreceiving region on a photoreceiving surface formed by the plurality of third photoreceptor elements, in the first direction.

Appendix 16

The wobble detection device according to any one of appendixes 1 to 15, comprising a sensor unit that includes the first image pickup unit and the second image pickup unit, wherein the sensor unit includes a light amount sensor that detects an amount of light, and
a plurality of the sensor units are provided and disposed at positions different from each other in the second direction.

Appendix 17

The wobble detection device according to appendix 16, wherein the sensor unit for detecting the wobble amount is selected from the plurality of sensor units based on values of the light amount sensors.

Appendix 18

The wobble detection device according to appendix 17, comprising a switching unit that selects the sensor unit for detecting the wobble amount.

Appendix 19

The wobble detection device according to appendix 18, comprising a switching control unit that controls the switching unit based on the values of the light amount sensors.

DESCRIPTION OF REFERENCE CHARACTERS

100, 200, 300: wobble detection device, 101, 103, 105: image data (reference image data), 102, 104, 106: image data (comparative image data), 110: test object (object), 110a, 111, 112, 113: scan object region, 120: illumination device, 130: imaging lens, 140: line scan camera, 141: photoreceiving surface (imaging surface), 142, 142a, 142b, 142c: image region, 150: transfer apparatus, 155, 156: light amount sensor, 16: first image pickup unit, 17: second image pickup unit, 160: first linear image sensor, 170: second linear image sensor, 160a, 170a: photoreceptor element, 180: control unit, 181: storage unit, 182, 183: A/D converter, 190: host device, 200: wobble detection device, 201, 202, 203, 204, 205, 206, 207, 208: image data, 210: test object (object), 211, 212, 213: scan object region, 220: illumination device, 230: imaging lens, 240: line scan camera, 241: photoreceiving surface (imaging surface), 250: transfer apparatus, 26: first image pickup unit, 27: second image pickup unit, 260: first linear image sensor, 265: third linear image sensor, 270: second linear image sensor, 260a, 265a, 270a: photoreceptor element, 282, 283, 284: A/D converter, 285, 286: adder, 280: control unit, 281: storage unit, 1811: memory #1, 1812: memory #2, 1813, 2813: buffer memory, 310, 400: train, 410: rail, 500: airplane, 510: ground (object), A, B, C, D, E, F: image region, DI: image movement direction, DO: transfer direction (first direction), i: memory address of image data, M1($i$), Mbuf($i+j$): signal intensity, Oh, Ih: height, 0: optical axis, S1, S2, S3, S4, S5, S6, S7: data, Wx, Wy, WPx, Iy: length.

What is claimed is:

1. A wobble detection device comprising:
a sensor unit that includes a first one-dimensional image sensor and a second one-dimensional image sensor arranged side by side in an auxiliary scanning direction so that corresponding pixels of the first one-dimensional image sensor and the second one-dimensional image sensor coincide with each other in a main scanning direction, and acquires an image of an object moving in the auxiliary scanning direction as one-dimensional data,
the wobble detection device making a comparison of data corresponding to a same image region of the image by using first one-dimensional data acquired by the first one-dimensional image sensor and second one-dimensional data acquired by the second one-dimensional image sensor and thereby detecting a movement amount of the image in the main scanning direction between a time when the first one-dimensional data used for the comparison was acquired and a time when the second one-dimensional data used for the comparison was acquired.

2. The wobble detection device according to claim 1, wherein a length of pixels of the first one-dimensional image sensor in the auxiliary scanning direction is equal to a length of pixels of the second one-dimensional image sensor in the auxiliary scanning direction.

3. The wobble detection device according to claim 2, wherein scanning of the image is performed at intervals, each interval being equal to a time for which the image moves the length in the auxiliary direction.

4. The wobble detection device according to claim 1, wherein correlation between the first one-dimensional data and the second one-dimensional data corresponding to the same image region is obtained.

5. The wobble detection device according to claim 1, comprising:
a first memory to store the first one-dimensional data;
a second memory to store first one-dimensional data of an image region differing in the auxiliary scanning direction from the image region of the first one-dimensional data stored in the first memory; and
a third memory to store the second one-dimensional data.

6. The wobble detection device according to claim 5, wherein correlation between data in the first memory and data in the third memory corresponding to the same image region or correlation between data in the second memory and data in the third memory corresponding to the same image region is obtained.

7. The wobble detection device according to claim 1, wherein
the sensor unit includes a third one-dimensional image sensor,
the third one-dimensional image sensor is disposed between the first one-dimensional image sensor and the second one-dimensional image sensor so that the one-dimensional image sensors are arranged in the auxiliary scanning direction and corresponding pixels of the one-dimensional image sensors coincide with each other in the main scanning direction, and acquires an image moving in the auxiliary scanning direction as third one-dimensional data,
fourth one-dimensional data is generated from the first one-dimensional data from the first one-dimensional image sensor and the third one-dimensional data from the third one-dimensional image sensor,
fifth one-dimensional data is generated from the second one-dimensional data from the second one-dimensional image sensor and the third one-dimensional data from the third one-dimensional image sensor, and
a comparison is made by using the fourth one-dimensional data and the fifth one-dimensional data corresponding to the same image region.

8. The wobble detection device according to claim 7, wherein photoreception sensitivity of the third one-dimensional image sensor is higher than photoreception sensitivity of the first one-dimensional image sensor and higher than photoreception sensitivity of the second one-dimensional image sensor.

9. The wobble detection device according to claim 7, wherein an amount of light received by the third one-dimensional image sensor is larger than an amount of light received by the first one-dimensional image sensor and larger than an amount of light received by the second one-dimensional image sensor.

10. The wobble detection device according to claim 7, wherein
fourth one-dimensional data is obtained from corresponding pixel data of the first one-dimensional data from the first one-dimensional image sensor and the third one-dimensional data from the third one-dimensional image sensor, and
fifth one-dimensional data is obtained from corresponding pixel data of the second one-dimensional data from the second one-dimensional image sensor and the third one-dimensional data from the third one-dimensional image sensor.

11. The wobble detection device according to claim 10, wherein correlation between the fourth one-dimensional data and the fifth one-dimensional data corresponding to the same image region is obtained.

12. The wobble detection device according to claim 7, comprising:
a first adder to add together corresponding pixel data of the first one-dimensional data from the first one-dimensional image sensor and the third one-dimensional data from the third one-dimensional image sensor; and
a second adder to add together corresponding pixel data of the second one-dimensional data from the second one-dimensional image sensor and the third one-dimensional data from the third one-dimensional image sensor.

13. The wobble detection device according to claim 12, comprising:
a first memory to store the fourth one-dimensional data from the first adder;
a second memory to store fourth one-dimensional data of an image region differing in the auxiliary scanning direction from the image region of the fourth one-dimensional data stored in the first memory; and
a third memory to store the fifth one-dimensional data from the second adder.

14. The wobble detection device according to claim 13, wherein correlation between data in the first memory and data in the third memory corresponding to the same image region or correlation between data in the second memory and data in the third memory corresponding to the same image region is obtained.

15. The wobble detection device according to claim 1, wherein
the sensor unit includes a light amount sensor,
a plurality of the sensor units are provided, and
the sensor unit for detecting the movement amount is selected based on light amount values of the light amount sensors.

* * * * *